US011710410B2

(12) United States Patent
Faccin et al.

(10) Patent No.: US 11,710,410 B2
(45) Date of Patent: Jul. 25, 2023

(54) TECHNIQUES FOR BROADCASTING FLIGHT INFORMATION FOR UNMANNED AERIAL VEHICLES

(71) Applicant: QUALCOMM Incorporated, San Diego, CA (US)

(72) Inventors: Stefano Faccin, San Ysidro, CA (US); Drew Foster Van Duren, Templeton, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 17/211,294

(22) Filed: Mar. 24, 2021

(65) Prior Publication Data

US 2021/0343154 A1 Nov. 4, 2021

Related U.S. Application Data

(60) Provisional application No. 63/017,421, filed on Apr. 29, 2020.

(51) Int. Cl.
*G08G 5/00* (2006.01)
*B64C 39/02* (2023.01)
*H04B 7/185* (2006.01)

(52) U.S. Cl.
CPC ......... *G08G 5/0008* (2013.01); *B64C 39/024* (2013.01); *H04B 7/18506* (2013.01)

(58) Field of Classification Search
CPC . G08G 5/0008; B64C 39/024; H04B 7/18506
USPC .......................................................... 340/971
See application file for complete search history.

(56) References Cited

U.S. PATENT DOCUMENTS

| | | | |
|---|---|---|---|
| 2017/0278410 A1* | 9/2017 | Byers | G08G 5/0026 |
| 2018/0350246 A1* | 12/2018 | Burgess | H04L 67/12 |
| 2020/0209895 A1* | 7/2020 | Wang | G05D 1/1062 |
| 2021/0065564 A1* | 3/2021 | Vacek | G08G 5/0026 |

* cited by examiner

*Primary Examiner* — Kerri L McNally
(74) *Attorney, Agent, or Firm* — Holland & Hart LLP

(57) ABSTRACT

Methods, systems, and devices for wireless communications are described. A wireless device may receive a broadcast remote identification (BRID) message from a unmanned aerial vehicle (UAV), where the BRID message may include an identity of the UAV. The wireless device may identify UAV information associated with the UAV based on the UAV ID. In some cases, the wireless device may be configured with information that enables the identification of the UAV information. In other cases, the wireless device may request the UAV information from a network entity, such as a UAV flight management system (UFMS), which provides the requested UAV information. In some examples, the UFMS may request the UAV information from an unmanned aerial system (UAS) service supplier (USS) based on the BRID information. Upon identifying the UAV information, the wireless device may broadcast the UAV information to manned aerial vehicles, thereby indicating a presence of the UAV.

29 Claims, 20 Drawing Sheets

TECHNIQUES FOR BROADCASTING FLIGHT INFORMATION FOR UNMANNED AERIAL VEHICLES

CROSS REFERENCE

The present application for patent claims the benefit of U.S. Provisional Patent Application No. 63/017,421 by Faccin et al., entitled "TECHNIQUES FOR BROADCASTING FLIGHT INFORMATION FOR UNMANNED AERIAL VEHICLES," filed Apr. 29, 2020, assigned to the assignee hereof, and expressly incorporated by reference herein.

FIELD OF TECHNOLOGY

The following relates generally to wireless communications and to techniques for broadcasting flight information for unmanned aerial vehicles (UAVs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for broadcasting flight information for unmanned aerial vehicles (UAVs). Generally, the described techniques provide for enabling the coexistence of UAVs and manned aircraft through signaling provided by a network (e.g., a terrestrial cellular network). For example, a UAV may broadcast information to surrounding devices in a broadcast remote identification (BRID) message. The BRID message may include various parameters or indications associated with the UAV and used by other devices to detect and learn information about the UAV (e.g., including the UAV's location, identity (ID), flight information, and the like). As such, the BRID may include a signal that can be interpreted by other UAVs (e.g., UAV to UAV) and by ground control stations (GCSs) (e.g., UAV to ground).

In some examples, a base station (or other wireless device, such as a wireless repeater, or user equipment (UE), or the like) may receive a BRID transmitted by a UAV. The base station may identify the UAV based on a UAV ID included in the BRID message. Here, the base station may identify the UAV and self-authenticate the UAV ID or may authenticate the UAV ID through signaling exchanged with another network node or network entity. In some cases, the base station may, based on the UAV ID, determine that the base station does not have a stored context for the UAV (i.e., the base station has not previously received signaling from the UAV). Based on the absence of the context for the UAV, the base station may query one or more network nodes to obtain UAV information associated with the UAV. In particular, the base station may transmit a request including the received BRID information to a network node (e.g., a UAV flight management system (UFMS)). The UFMS may, in turn, obtain additional information from an unmanned aerial system (UAS) service supplier (USS) based on the BRID information. For instance, the UFMS may select an appropriate USS based on the UAV ID associated with the BRID information and request the information from the selected USS. The USS may respond to the UFMS with the UAV information (e.g., include a UAV hardware ID, pilot information, or the like), and the UFMS may provide the UAV information to the base station. In other cases, the UFMS may have the UAV information and may provide such UAV information to the base station without sending a request to the USS. Additionally or alternatively, the base station may be configured to identify the UAV information, for example, based on information provided to the base station about one or more UAVs. In any case, the base station may broadcast the UAV information associated with the UAV to one or more manned vehicles. The broadcast UAV information may be included in a traffic information service broadcast (TIS-B) message, or an automatic dependent surveillance broadcast (ADS-B) message, or any combination thereof. As a result, the information broadcast by the base station may enable the one or more manned vehicles to detect the presence of the UAV through the broadcast UAV information, thereby preventing collisions and enabling the coexistence of UAVs and manned aircraft.

A method of wireless communication at a first wireless device is described. The method may include receiving a BRID message, the BRID message including BRID information including an ID of a UAV, identifying UAV information for the UAV based on the BRID information and the ID of the UAV, and broadcasting, to one or more manned aerial vehicles, the identified UAV information that indicates a presence of the UAV.

An apparatus for wireless communication at a first wireless device is described. The apparatus may include a processor, memory coupled with the processor, and instructions stored in the memory. The instructions may be executable by the processor to cause the apparatus to receive a BRID message, the BRID message including BRID information including an ID of a UAV, identify UAV information for the UAV based on the BRID information and the ID of the UAV, and broadcast, to one or more manned aerial vehicles, the identified UAV information that indicates a presence of the UAV.

Another apparatus for wireless communication at a first wireless device is described. The apparatus may include means for receiving a BRID message, the BRID message including BRID information including an ID of a UAV, identifying UAV information for the UAV based on the BRID information and the ID of the UAV, and broadcasting, to one or more manned aerial vehicles, the identified UAV information that indicates a presence of the UAV.

A non-transitory computer-readable medium storing code for wireless communication at a first wireless device is described. The code may include instructions executable by a processor to receive a BRID message, the BRID message including BRID information including an ID of a UAV, identify UAV information for the UAV based on the BRID information and the ID of the UAV, and broadcast, to one or more manned aerial vehicles, the identified UAV information that indicates a presence of the UAV.

In some examples of the method, apparatuses, and non-transitory computer-readable medium described herein, identifying the UAV information may include operations, features, means, or instructions for determining an absence of a context for the ID of the UAV at the first wireless device, transmitting, to a network entity, a report including the BRID information based on the absence of the context, and receiving the UAV information from the network entity in response to the report.

Some examples of the method, apparatuses, and non-transitory computer-readable medium described herein may further include operations, features, means, or instructions for selecting the network entity based on the ID of the UAV.

Some examples of the method, apparatuses, and non-transitory computer-readable medium described herein may further include operations, features, means, or instructions for selecting the network entity based on a location of the UAV, or a traffic management authority associated with the location of the UAV, or any combination thereof.

In some examples of the method, apparatuses, and non-transitory computer-readable medium described herein, the report includes the ID of the UAV and location information for the UAV based on the BRID information.

In some examples of the method, apparatuses, and non-transitory computer-readable medium described herein, broadcasting the UAV information may include operations, features, means, or instructions for generating a TIS-B message including the UAV information, and broadcasting the TIS-B message to the one or more manned aerial vehicles.

Some examples of the method, apparatuses, and non-transitory computer-readable medium described herein may further include operations, features, means, or instructions for receiving, from a network entity, a request to broadcast information associated with one or more UAVs, the request including the information to be broadcast, and broadcasting the information associated with the one or more UAVs in accordance with the request.

In some examples of the method, apparatuses, and non-transitory computer-readable medium described herein, the information associated with the one or more UAVs includes an ID of each UAV of the one or more UAVs, ADS-B identification information for each UAV of the one or more UAVs, location information for each UAV of the one or more UAVs, track information for each UAV of the one or more UAVs, or any combination thereof.

In some examples of the method, apparatuses, and non-transitory computer-readable medium described herein, a first ID associated with a first UAV of the one or more UAVs includes a list of one or more UAV identifiers, the list including a set of related identifiers for the first UAV.

In some examples of the method, apparatuses, and non-transitory computer-readable medium described herein, a first ID associated with a first UAV of the one or more UAVs includes an identifier embedded in a broadcast-signing digital certificate, or a transform of the digital certificate, or an identifier generated from a cryptographic hash, or any combination thereof.

In some examples of the method, apparatuses, and non-transitory computer-readable medium described herein, the ADS-B identification information for each UAV includes a flight number, a call sign, an aircraft address, an airframe code, or any combination thereof.

In some examples of the method, apparatuses, and non-transitory computer-readable medium described herein, the ADS-B identification information for each UAV may be generated based on the ID of each UAV.

In some examples of the method, apparatuses, and non-transitory computer-readable medium described herein, the location information for each UAV includes instructions for converting location information included in BRID information for each UAV into an ADS-B format, the ADS-B format including a latitude, a longitude, a position integrity, a position accuracy, global positioning system (GPS) information, an altitude, a climb rate, a descent rate, a track angle, a ground speed, or any combination thereof.

Some examples of the method, apparatuses, and non-transitory computer-readable medium described herein may further include operations, features, means, or instructions for identifying, from the information associated with the one or more UAVs, a flight schedule for the one or more UAVs, the flight schedule indicating a planned trajectory of the one or more UAVs, where broadcasting the information may be based on one or both of the identified flight schedule or the planned trajectory and detecting at least one BRID message from each of the one or more UAVs.

In some examples of the method, apparatuses, and non-transitory computer-readable medium described herein, the information associated with the one or more UAVs includes an indication of a TIS-B server. In some examples of the method, apparatuses, and non-transitory computer-readable medium described herein, the network entity includes a UFMS.

In some examples of the method, apparatuses, and non-transitory computer-readable medium described herein, identifying the UAV information may include operations, features, means, or instructions for receiving a configuration for identifying the UAV information, and identifying the UAV information based on the configuration.

In some examples of the method, apparatuses, and non-transitory computer-readable medium described herein, the configuration includes a set of parameters associated with one or more USSs, where the UAV information may be identified based on the set of parameters.

Some examples of the method, apparatuses, and non-transitory computer-readable medium described herein may further include operations, features, means, or instructions for identifying a position of a manned aircraft based on detecting one or more ADS-B messages, and determining, in accordance with the configuration, that a separation between the manned aircraft and the UAV satisfies a threshold based on the position of the manned aircraft, where broadcasting the UAV information may be based on the separation satisfying the threshold.

Some examples of the method, apparatuses, and non-transitory computer-readable medium described herein may further include operations, features, means, or instructions for identifying, in accordance with the configuration, a type of the UAV based on the BRID information, where the UAV information may be broadcast based on the type of the UAV.

Some examples of the method, apparatuses, and non-transitory computer-readable medium described herein may further include operations, features, means, or instructions for identifying, in accordance with the configuration, a location of the UAV based on the BRID information, where broadcasting the UAV information may be based on the UAV being located within a region or cell associated with the first wireless device.

Some examples of the method, apparatuses, and non-transitory computer-readable medium described herein may further include operations, features, means, or instructions for determining the location of the UAV based on location information that includes GPS information, triangulation information, one or more received signal strength indicators (RSSIs), or any combination thereof, where determining the location of the UAV includes identifying the location information of the UAV, augmenting the location information of the UAV, verifying the location information of the UAV, or any combination thereof.

Some examples of the method, apparatuses, and non-transitory computer-readable medium described herein may further include operations, features, means, or instructions for receiving, from a network entity, a subscription request for information reporting associated with one or more UAVs, and transmitting a confirmation of the subscription request to the network entity.

Some examples of the method, apparatuses, and non-transitory computer-readable medium described herein may further include operations, features, means, or instructions for transmitting, via the network entity, an information report to a TIS-B server based on the subscription request, the information report including one or more of BRID information or GPS information associated with the one or more UAVs.

Some examples of the method, apparatuses, and non-transitory computer-readable medium described herein may further include operations, features, means, or instructions for generating an ADS-B message including the UAV information, and broadcasting the ADS-B message to the one or more manned aerial vehicles.

Some examples of the method, apparatuses, and non-transitory computer-readable medium described herein may further include operations, features, means, or instructions for receiving, from a second wireless device, second BRID information associated with a second UAV, and broadcasting UAV information associated with the second UAV based on the second BRID information.

Some examples of the method, apparatuses, and non-transitory computer-readable medium described herein may further include operations, features, means, or instructions for receiving, from a network entity, a request to report the BRID information to a second wireless device, and transmitting the BRID information to the second wireless device in accordance with the received request.

In some examples of the method, apparatuses, and non-transitory computer-readable medium described herein, the request includes a configuration of a time duration for reporting the BRID information, a radio frequency for reporting the BRID information, one or more geofenced areas, a configuration indicating an ADS-B message broadcast rate for the UAV, or any combination thereof.

In some examples of the method, apparatuses, and non-transitory computer-readable medium described herein, the first wireless device includes a base station, or a user equipment, or a repeater device.

A method of wireless communication at a network entity is described. The method may include receiving, from a first wireless device, BRID information including an ID of a UAV, selecting a USS based on the ID of the UAV, transmitting, to the selected USS, a request for UAV information associated with the UAV, and receiving the UAV information from the selected USS in response to the request.

An apparatus for wireless communication at a network entity is described. The apparatus may include a processor, memory coupled with the processor, and instructions stored in the memory. The instructions may be executable by the processor to cause the apparatus to receive, from a first wireless device, BRID information including an ID of a UAV, select a USS based on the ID of the UAV, transmit, to the selected USS, a request for UAV information associated with the UAV, and receive the UAV information from the selected USS in response to the request.

Another apparatus for wireless communication at a network entity is described. The apparatus may include means for receiving, from a first wireless device, BRID information including an ID of a UAV, selecting a USS based on the ID of the UAV, transmitting, to the selected USS, a request for UAV information associated with the UAV, and receiving the UAV information from the selected USS in response to the request.

A non-transitory computer-readable medium storing code for wireless communication at a network entity is described. The code may include instructions executable by a processor to receive, from a first wireless device, BRID information including an ID of a UAV, select a USS based on the ID of the UAV, transmit, to the selected USS, a request for UAV information associated with the UAV, and receive the UAV information from the selected USS in response to the request.

Some examples of the method, apparatuses, and non-transitory computer-readable medium described herein may further include operations, features, means, or instructions for selecting a second wireless device to broadcast a TIS-B message including the UAV information based on a location of the UAV information with relation to the second wireless device, and transmitting, to the second wireless device, a request to broadcast the UAV information using the TIS-B message.

In some examples of the method, apparatuses, and non-transitory computer-readable medium described herein, the second wireless device may be different from the first wireless device. In some examples of the method, apparatuses, and non-transitory computer-readable medium described herein, the second wireless device may be the same as the first wireless device.

Some examples of the method, apparatuses, and non-transitory computer-readable medium described herein may further include operations, features, means, or instructions for transmitting, to the first wireless device, a request to report at least the BRID information to a second wireless device based on a location of the UAV, the request including a configuration of a time duration for reporting the BRID information, a radio frequency for reporting the BRID information, or any combination thereof.

Some examples of the method, apparatuses, and non-transitory computer-readable medium described herein may further include operations, features, means, or instructions for transmitting, to the first wireless device, a configuration for identifying the UAV information.

Some examples of the method, apparatuses, and non-transitory computer-readable medium described herein may further include operations, features, means, or instructions for receiving, from the USS, an indication of one or both of a flight schedule or planned trajectory for one or more UAVs, selecting one or more wireless devices for broadcasting UAV information for the one or more UAVs based on the flight schedule, or the planned trajectory, or any combination thereof, and transmitting, to each of the one or more wireless devices, a request to broadcast the UAV information for the one or more UAVs.

In some examples of the method, apparatuses, and non-transitory computer-readable medium described herein, the UAV information includes the ID of the UAV, ADS-B identification information for the UAV, location information for the UAV, or any combination thereof.

Some examples of the method, apparatuses, and non-transitory computer-readable medium described herein may further include operations, features, means, or instructions for receiving, as part of the UAV information, an indication of a TIS-B server, and transmitting the indication of the TIS-B server to the first wireless device.

Some examples of the method, apparatuses, and non-transitory computer-readable medium described herein may further include operations, features, means, or instructions for receiving, from the TIS-B server, a first subscription request for information reporting associated with one or more UAVs, where the first subscription request includes a correlation identifier for the one or more UAVs, and identifying one or more UAV identifiers and a wireless device corresponding to the one or more UAV identifiers based on the correlation identifier.

Some examples of the method, apparatuses, and non-transitory computer-readable medium described herein may further include operations, features, means, or instructions for transmitting, to the wireless device, a second subscription request for information reporting associated with the one or more UAV identifiers based on the first subscription request, receiving a confirmation of the second subscription request from the wireless device, and transmitting a confirmation of the first subscription request to the TIS-B server.

Some examples of the method, apparatuses, and non-transitory computer-readable medium described herein may further include operations, features, means, or instructions for receiving, from the wireless device and based on the second subscription request, reporting information including an indication of BRID information or GPS information, or both, that may be associated with the one or more UAV identifiers, and transmitting the reporting information to the TIS-B server based on the first subscription request.

In some examples of the method, apparatuses, and non-transitory computer-readable medium described herein, the first wireless device includes a base station, or a user equipment, or a repeater device. In some examples of the method, apparatuses, and non-transitory computer-readable medium described herein, the network entity includes a UFMS.

A method of wireless communication at a USS is described. The method may include receiving, from a network entity, a request for UAV information associated with a UAV, the request including BRID information including an ID of the UAV, determining the UAV information based on the BRID information, and transmitting the UAV information to the network entity.

An apparatus for wireless communication at a USS is described. The apparatus may include a processor, memory coupled with the processor, and instructions stored in the memory. The instructions may be executable by the processor to cause the apparatus to receive, from a network entity, a request for UAV information associated with a UAV, the request including BRID information including an ID of the UAV, determine the UAV information based on the BRID information, and transmit the UAV information to the network entity.

Another apparatus for wireless communication at a USS is described. The apparatus may include means for receiving, from a network entity, a request for UAV information associated with a UAV, the request including BRID information including an ID of the UAV, determining the UAV information based on the BRID information, and transmitting the UAV information to the network entity.

A non-transitory computer-readable medium storing code for wireless communication at a USS is described. The code may include instructions executable by a processor to receive, from a network entity, a request for UAV information associated with a UAV, the request including BRID information including an ID of the UAV, determine the UAV information based on the BRID information, and transmit the UAV information to the network entity.

Some examples of the method, apparatuses, and non-transitory computer-readable medium described herein may further include operations, features, means, or instructions for determining a location of the UAV based on the BRID information, and transmitting a confirmation of the location to the network entity.

Some examples of the method, apparatuses, and non-transitory computer-readable medium described herein may further include operations, features, means, or instructions for transmitting ADS-B related information based on the BRID information, where the UAV information includes the ADS-B related information.

Some examples of the method, apparatuses, and non-transitory computer-readable medium described herein may further include operations, features, means, or instructions for identifying one or more flight profiles including flight schedules for one or more UAVs, one or more trajectories for the one or more UAVs, one or more maneuvers for the one or more UAVs, or any combination thereof, and transmitting, to the network entity, an indication of the one or more flight profiles.

In some examples of the method, apparatuses, and non-transitory computer-readable medium described herein, the request from the network entity includes a request for relaying detected ADS-B information for representation in one or more traffic management systems, the detected ADS-B information being received from a manned aircraft by the network entity.

Some examples of the method, apparatuses, and non-transitory computer-readable medium described herein may further include operations, features, means, or instructions for selecting a TIS-B server based on the BRID information, and transmitting, to the selected TIS-B server, the UAV information, an ID of the network entity, an address of the network entity, a correlation identifier, ADS-B identification information, or any combination thereof. Some examples of the method, apparatuses, and non-transitory computer-readable medium described herein may further include operations, features, means, or instructions for transmitting, to the network entity, an indication of the selected TIS-B server.

DETAILED DESCRIPTION

Figure 1:
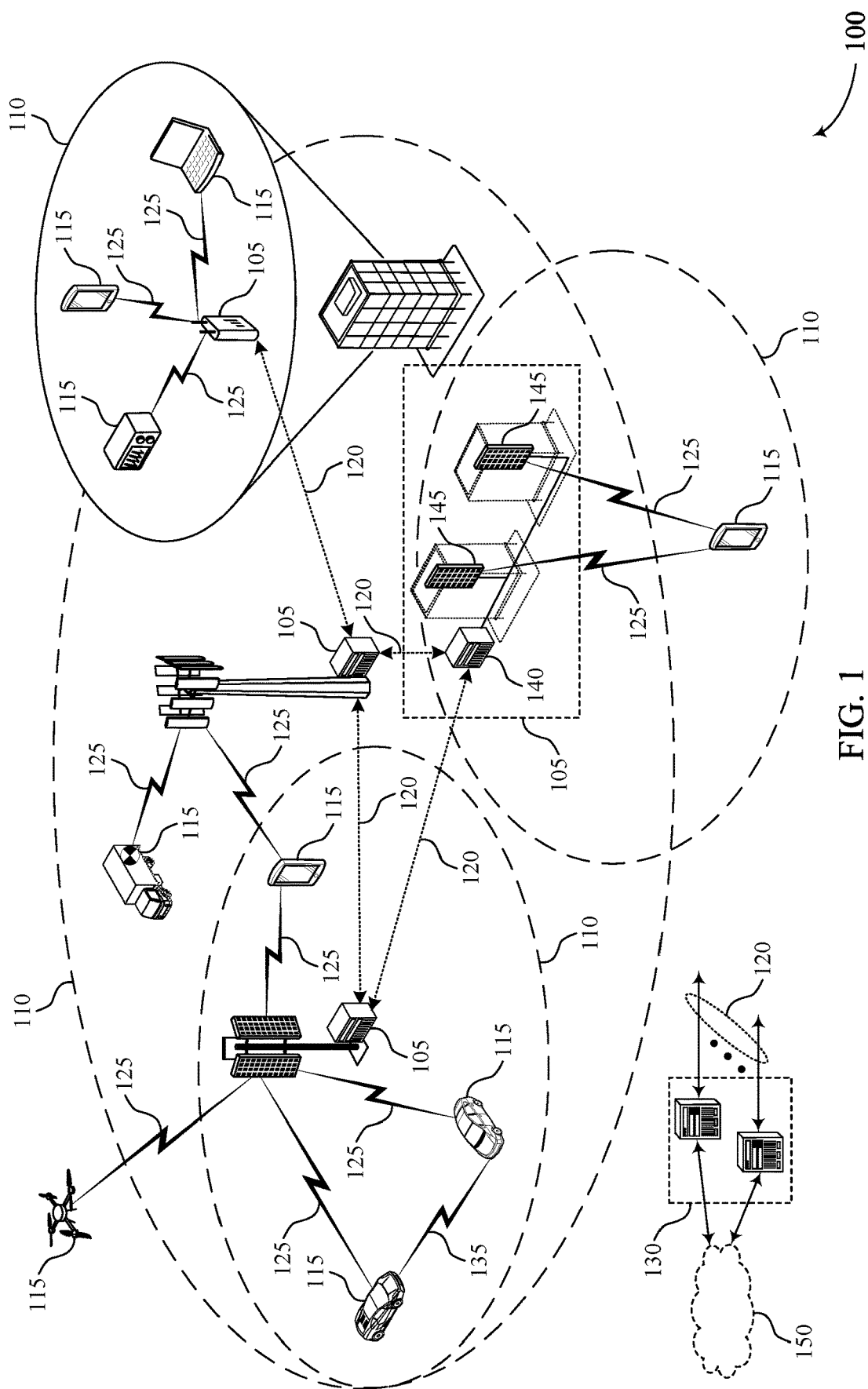
FIG. 1 illustrates an example of a system for wireless communications that supports techniques for broadcasting flight information for unmanned aerial vehicles (UAVs) in accordance with aspects of the present disclosure.

Unmanned aerial vehicles (UAVs), which may also be referred to as drones, may include the capability to transmit or receive wireless signals, including the transmission of various messages to other devices (e.g., to other UAVs or to ground-based devices). For example, in the United States, the Federal Aviation Administration (FAA) implemented Remoted Identification (Remote ID) for unmanned aircraft systems (UASs) to enable public and civil identification of UASs for safety, security, and compliance purposes. Specifically, Remote ID may enable a UAS to broadcast information that includes an identity (ID) of the UAV (e.g., an aircraft ID) in addition to various parameters related to the movement of the UAV (including location/vector, latitude/longitude, speed, direction, altitude, etc.). As such, Remote ID may provide a way to receive information about UAVs for tracking and collision avoidance. Comparatively, manned aviation uses automatic dependent surveillance-broadcast (ADS-B) messages, where a manned aircraft may determine its position and periodically broadcasts ADS-B information for tracking and air traffic management. However, UAVs may be unable to use ADS-B (e.g., due to limited available spectrum in ADS-B radio frequencies and a potentially high number of UAVs). That is, UAVs and manned aircraft may use different systems for signaling location/vector information, and the two types of vehicles may be unable to directly communicate with one another as a result, leading to some potentially dangerous environments when both UASs and manned aircraft are present. Thus, there may be a desire for techniques that enable both UASs and manned aviation to coexist.

As described herein, networks (e.g., terrestrial cellular networks, among other systems), may be incorporated into traffic management for UASs. In particular, a UAV may broadcast information (e.g., broadcast remote ID (BRID) information) that is received by one or more base stations. In cases where a base station does not have any stored context for the UAV (e.g., the UAV may not have been previously identified by the base station), the base station may then transmit the received BRID information to a network entity, server, or subsystem of the network (e.g., a UAV flight management system (UFMS)), which provides UAV authorization, authentication, identification and tracking. The UFMS may also interface with an external, UAS service supplier (USS) for the authorization, identification, and tracking services, where a particular USS may be selected based on the UAV ID included in the received BRID information. The selected USS may in turn generate and supply (e.g., to the UFMS) ADS-B-like information for the identified UAV. Such information may be provided to the base station, and the base station may broadcast the information to nearby aircraft (e.g., both manned and unmanned). For instance, the base station may broadcast ADS-B information corresponding to each UAV for which the base station has received the BRID. Alternatively, the base station may generate traffic information service-broadcast (TIS-B) information containing the information about the detected UAVs based on the ADS-B-like information. As such, the base station may provide the location and ID information for the UAVs for which it has received BRID information, thereby enabling nearby manned aircraft to know the location and movement information associated with the detected UAV(s).

Particular aspects of the subject matter described herein may be implemented to realize one or more potential advantages. For example, the described techniques may enable manned aircraft to efficiently identify UAVs that are nearby, and the manned aircraft may account for such UAVs for traffic management and safety. For instance, while some UAVs may operate at relatively low altitudes, such UAVs may operate near airports or landing strips, which may affect a manned aircraft from landing or taking off. In other examples, UAVs may operate at high altitudes or may operate on behalf of emergency services, and the location and flight path of such UAVs may be taken into account for flight management of manned and unmanned vehicles. Thus, the identification of the UAVs may provide enhanced safety for other aircraft. In some examples, the described techniques for ensuring the coexistence of manned aircraft and UAVs may result in more efficient traffic management and service enhancement in the system. Further, by increasing the likelihood for successful identification of UAVs by manned aircraft through the incorporation of a terrestrial cellular network for signaling, various signals and UAV information may be dynamically broadcast based on configurations or functions performed by the devices within the cellular network (e.g., the detection of other aircraft, the identification of UAV flight plans, or the like).

Aspects of the disclosure are initially described in the context of wireless communications systems. Further examples are then provided with respect to process flows that illustrate the signaling of UAV information between various devices to enable coexistence of UAVs and manned aircraft. Aspects of the disclosure are further illustrated by and described with reference to apparatus diagrams, system diagrams, and flowcharts that relate to techniques for broadcasting flight information for UAVs.

FIG. 1 illustrates an example of a wireless communications system 100 that supports techniques for broadcasting flight information for UAVs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The wireless communications system 100 may include one or more repeating devices (e.g., wireless repeaters). A wireless repeater may include functionality to repeat, extend, and redirect wireless signals transmitted within a wireless communications system. In some cases, wireless repeaters may be used in line of sight (LOS) or non-line of sight (NLOS) scenarios. In a LOS scenario, directional (e.g., beamformed) transmissions, such as mmW transmissions, may be limited by path-loss through air. In a NLOS scenario, such as in an urban area or indoors, mmW transmissions may be limited by signal blocking or signal interfering physical objects. In either scenario, a wireless repeater may be used to receive a signal from a base station 105 and transmit a signal to UE 115, or receive a signal from a UE 115 and transmit the signal to the base station 105. Beamforming, filtering, gain control, and phase correction techniques may be utilized by a wireless repeater to improve signal quality and avoid radio frequency interference with the transmitted signal.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some examples, a UE 115 may be an example of a drone or UAV.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In cases where one or more UEs 115 in the wireless communications system 100 are drones (e.g., UAVs), there may be various needs for UAV traffic management. In particular, drones or unmanned aircraft systems (UASs) may fundamentally change aviation, and regulatory bodies (e.g., FAA or European Union Aviation Safety Agency (EASA)) may fully integrate drones or UASs into national airspace systems. Here, safety and security may be high-priority aspects of such systems, and the use of techniques, such as remote ID (or RID) of the FAA (and U-Space of EASA), may be important for integration efforts. In some examples, UAS Remote ID includes an ability of a UAS in flight to provide identification information that can be received by other parties. Remote ID may help facilitate advanced operations for UASs and provide the groundwork for UAS traffic management. Further, remote ID may assist regulatory agencies, flight control agencies, law enforcement (e.g., where a ground control system is a federal bureau of investigation (FBI) or police terminal), and federal security agencies when a UAS appears to be flying in an unsafe manner or where the drone is not allowed to fly. In addition, remote ID may extend the operating environment for drones in critical areas (e.g., in areas where UAS operation may support safety or emergency services, among other examples).

As UAV operation becomes more and more ubiquitous (e.g., for commercial operation, for private operation), it therefore becomes increasingly important to ensure the safety of drone operation, particularly as it relates to manned aircraft. Various countries and regions may begin to implement aspects that provide structure for UAV traffic management. For example, in the United States, private unmanned aircraft systems service suppliers (USSs) may be certified by the FAA. Each USS may take responsibility for exchanging data and coordinating with other USSs. In such cases, data used for coordination with the air traffic management system may pass through an information exchange, which may be referred to as system wide information management (SWIM), which may be run by the FAA and stores information such as flight plans. In addition, the FAA may also operate a flight information management system (FIMS) that coordinates between USS providers, traditional air traffic management, and a national airspace system. In some cases, USSs may provide low altitude authorization and notification capabilities (LAANC) to operators who wish to fly unmanned missions, for example, in controlled airspace near airports. In some examples, the airspace available to UAVs may be expanded to permit greater autonomy.

In other examples, Europe may provide functionality for UAV traffic management through U-space service providers (USPs), which may exchange some information and coordinate through a SWIM system. UAVs may also communicate with a U-space system manager (e.g., similar to a Single European Sky network manager), which may act as a centralized coordinator (such as in a manner similar to NASA's FIMS), as well as managing traffic. Other providers may be responsible for non-safety-critical services, as well as data on weather and terrain. Additionally, UAV traffic management in China may include the use of a civil UAS Operation Management System (UOMS), which may include several unmanned aircraft cloud system (UACS) providers responsible for a final link to the operator. These may supply alerts, geofencing, registration, vehicle location services, and the like. As a further example, Japan may include a UAV traffic management system that includes a FIMS, several UAS service providers (UASSP), a layer of supplemental data source providers (SDSP), and operators. In such cases, the FIMS may manage flight plans, handle emergency alerting and provides avoidance instructions. The UASSP may sit between FIMS and each operator.

In any of these cases of national or regional UAV flight management, it may thus become increasingly important to ensure these systems account not only for UAV flight management, but also the operation of manned aerial vehicles to ensure safe operation of different vehicles. As such, the wireless communications system 100 may support the coexistence of UAVs and manned aircraft through signaling provided by a terrestrial cellular network. In particular, the wireless communications system 100 may be used for enhanced techniques for efficient UAV traffic management. For example, a UAV or drone (which may be an example of a UE 115, as illustrated) may broadcast information to surrounding devices in a BRID message. The BRID message may include various parameters or indications associated with the UAV and used by other devices to detect and learn information about the UAV (e.g., including the UAV's location, ID, flight information, and the like). As such, the BRID may include a signal that can be interpreted by other UAVs (e.g., UAV to UAV) and by ground control stations (GCSs) (e.g., UAV to ground).

A base station 105 (or other wireless device, such as a wireless repeater, or UE 115, or the like) may receive a BRID transmitted by a UAV. The base station 105 may identify the UAV based on a UAV ID included in the BRID message. In some cases, the base station 105 may, based on the UAV ID, determine that the base station 105 does not have a context for the UAV stored (i.e., the base station 105 has not previously received signaling from, or identified, the UAV). Based on the absence of the context for the UAV, the base station 105 may query one or more network nodes (e.g., in communication with or as part of the core network 130) to obtain UAV information associated with the UAV. In particular, the base station 105 may transmit a request including the received BRID information to a network node (e.g., a UFMS). The UFMS may, in turn, obtain additional information from a USS based on the BRID information. For instance, the UFMS may select a USS based on the UAV ID associated with the BRID information and request the information from the selected USS. The USS may respond to the UFMS with the UAV information (e.g., include a UAV hardware ID, pilot information, or the like), and the UFMS may provide the UAV information to the base station 105. In other cases, the UFMS may have the UAV information and may provide such UAV information to the base station 105 without sending a request to the USS. Additionally or alternatively, the base station 105 may be configured to identify the UAV information, and may have received (or have access to) one or more aspects of the UAV information. In any case, the base station 105 may broadcast the UAV information associated with the UAV to one or more manned vehicles. The broadcast UAV information may be included in a TIS-B message, or an ADS-B message, or any combination thereof. As a result, the information broadcast by the base station 105 may enable the one or more manned vehicles to detect the presence of the UAV through the broadcast UAV information, thereby preventing collisions and enabling the coexistence of UAVs and manned aircraft.

It is noted that, while some aspects of the disclosure are described with relation to remote ID and USS implementations, which may be associated with aspects implemented by the FAA in the United States, the same or similar techniques may also apply to other flight management systems utilized in other regions or countries. That is, the techniques described herein should not be considered as being limited to remote ID or the FAA, and such techniques may be applicable to other systems and functions that provide UAS flight management. For instance, the described techniques may be utilized in the U-space system in Europe, among other examples.

Figure 2:
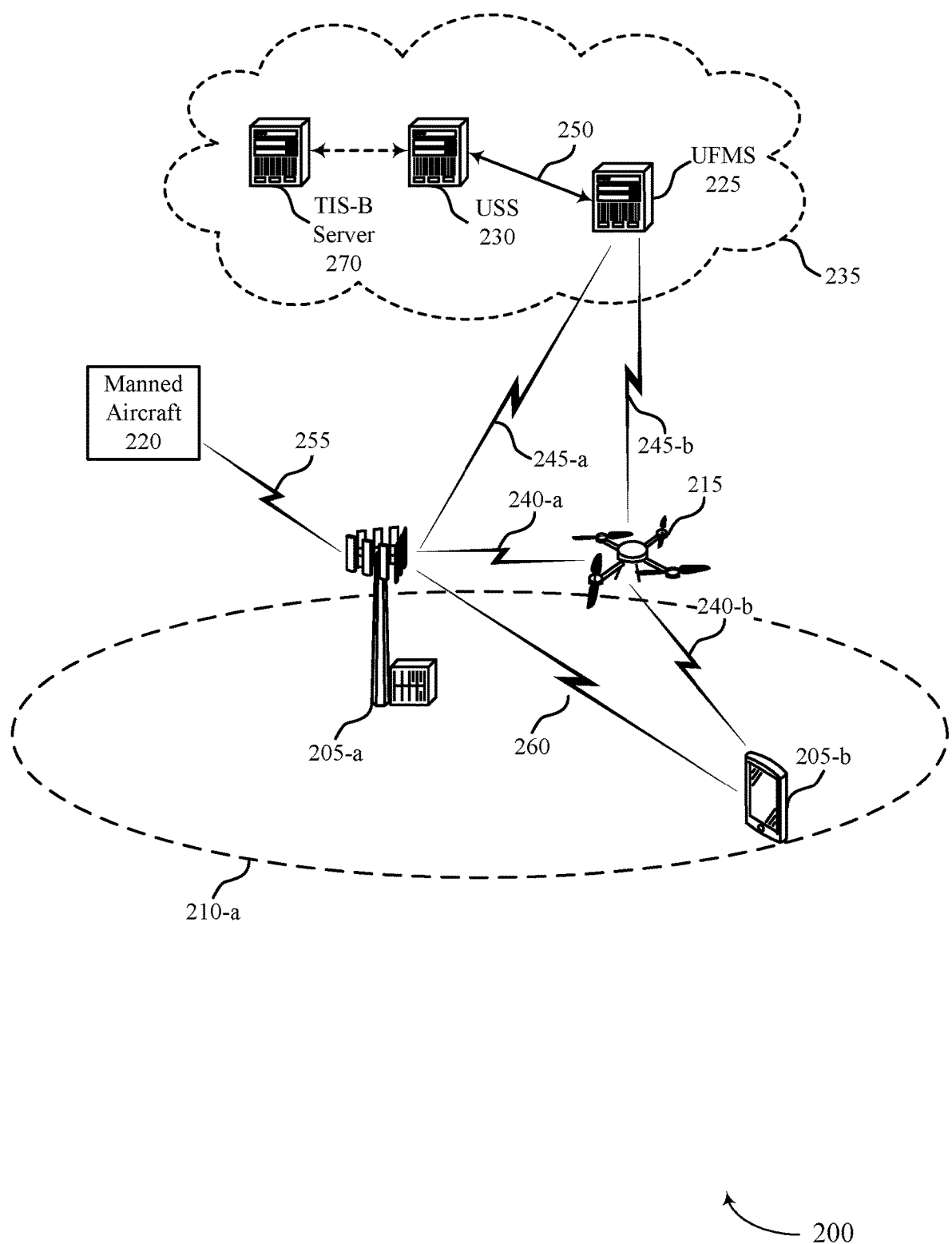
FIG. 2 illustrates an example of a wireless communications system that supports techniques for broadcasting flight information for UAVs in accordance with aspects of the present disclosure.

FIG. 2 illustrates an example of a wireless communications system 200 that supports techniques for broadcasting flight information for UAVs in accordance with aspects of the present disclosure. In some examples, the wireless communications system 200 may implement aspects of wireless communications system 100. For example, wireless communications system 200 may include various wireless devices 205, which may be examples of a base station 105, a UE 115, a repeater device, or other wireless devices, as described with reference to FIG. 1. Wireless communications system 200 may also include one or more UAVs 215 (e.g., drones). In some aspects, a UAV 215 may be an example of a UE 115 as described with reference to FIG. 1. Wireless communications system 200 may also include one or more manned aircrafts 220, a network entity (e.g., a UFMS 225), a USS 230, a core network 235 (which may be an example of the core network 130 described with reference to FIG. 1), and may optionally include a TIS-B server 270.

The UAV 215 may be a part of a UAS. The UAS may include a UAV controller and one or more UAVs, where each of the one or more UAVs may be connected with (e.g., in communication with) each other using wireless communications technologies. In some cases, UAV controller may be configured to issue functions and commands (e.g., navigation, geo-fencing, detection, monitoring, identification, flight planning) to the UAV 215 and to receive data (e.g., telemetry) from the UAV 215. Additionally, the UAV controller may also be coupled with a UE 115 that is used to communicate with a wireless network as described with reference to FIG. 1. In other examples, the UAV controller itself may be connected to a wireless network (e.g., a 3GPP mobile network, among other example networks) and may also be connected to the Internet. Additionally or alternatively, the UAV controller may not be connected to the mobile network, and may utilize, for example, a command and control (C2) interface. In some cases, each UAV of the UAS may exchange application data traffic with the USS 230.

A UAV 215 may implement remote identification (remote ID) technologies for UASs. Remote ID may enable public and civil identification of UASs for safety, security, and compliance purposes. For instance, remote ID may increase UAV operation accountability by generating UAV identification information while preserving operation and personal privacy for UAV operators and associates (e.g., companies implementing UAVs and their customers). Remote ID may also include multiple information parameters related to the movement of the UAV 215 (e.g., location/vector, latitude/longitude, speed, direction, or altitude) as well as information about the accuracy of the movement parameters. For example, remote ID may include the transmission of a message (e.g., a BRID message) that includes various data fields that include information associated with the UAV that transmitted the BRID message. In some examples, the identification information may include a UAS ID, which may further include a serial number (e.g., when no registration ID exists, which may be expressed in an ANSI/CTA-2063 Physical Serial Number format), a registration number (e.g., a number provided by a civil aviation authority (CAA) or its authorized representative), or a UAV traffic management (UTM) assigned ID (UUID) (e.g., a UTM-provided unique ID that may be traceable to a registration ID and may act as a "session id" to protect exposure of operationally sensitive information).

The parameters associated with the UAV 215 included in the BRID message may include a UAV type (e.g., fixed wing, quad rotor, etc., which may differentiate between different aircraft types), a timestamp (e.g., a time of applicability of a dynamic message, which may be based on a time source, such as via Global Positioning System (GPS), or a time when the message was computed), a timestamp accuracy (e.g., a declaration of timestamp accuracy within some time period), operation status of the UAV 215 (e.g., on the ground or in the air), operation description (e.g., an explanation of the reason for the presence of the UAV 215), or any combination thereof. Further, the additional parameters may include fields that provide for location, direction, and movement information of the UAV 215. For example, various fields may provide for a latitude, a longitude, a geodetic altitude (e.g., the aircraft distance above an ellipsoid), a height above the takeoff location of the UAV 215, a pressure altitude of position (e.g., based on a reference standard), a vertical accuracy, a horizontal accuracy, a speed (e.g., with reference to a cardinal direction), a vertical speed, or any combination thereof. The various parameters may further include operator information (e.g., operator location, operator ID), group information (e.g., in cases of multiple UAV operating in a swarm or formation), and security or authentication token information.

Thus, remote ID may enable a UAV 215 to broadcast or transmit BRID information (e.g., in a BRID message) to other devices. The message may be sent, for example, at least once per second, and each message may include between 50-1500 bytes of information. The BRID message may include capabilities for cooperative collision avoidance (up to 10 Hertz (Hz)). Moreover, a BRID message may include full security for broadcasts (e.g., integrity protection, privacy protection, spoofing protection, nonrepudiation, confidentiality protection).

The BRID information may be transmitted to other UAVs 215 (e.g., via a UAV-to-UAV (U2U) interface), or may be transmitted to other ground-based devices, such as wireless device 205-a (e.g., via a UAV1 interface). In some examples, a BRID message may be transmitted via various radio access technologies. For example, a UAV 215 may broadcast information using Bluetooth (e.g., Bluetooth 4, Bluetooth 5) or using Wi-Fi. However, such technologies may be limited. In particular, Bluetooth technologies may be limited in range (e.g., Bluetooth 4 may be limited to 400 meters, without interference), limited in capacity (e.g., Bluetooth 5 may have a slower speed compared to other technologies), or may interfere with other wireless devices (e.g., Wi-Fi transmissions may affect the interoperability with other devices, such as a UE 115 or various Wi-Fi stations or access points).

Further, the use of remote ID and the transmission of BRID message may not be compatible with the presence of one or more manned aircraft 220. In particular, manned aviation may use ADS-B messages, where the manned aircraft 220 may determine its position and periodically broadcast ADS-B information for tracking and air traffic management. Specifically, ADS-B may include a system in which electronic equipment onboard an aircraft automatically broadcasts a location of the aircraft via a digital data link. The data may be used by other aircraft and air traffic control, for example, to show the aircraft's position and altitude on display screens without the need for radar. The system may include a manned aircraft 220 with ADS-B determining its position using GPS. A transmitter may then broadcast the determined position at intervals, along with ID, altitude, velocity and other data. Dedicated ADS-B grounds stations may receive the broadcasts and relay the information to air traffic control for tracking of the manned aircraft 220. In some cases, ADS-B information may not require user input or external interrogation, and may depend on accurate position and velocity data from the aircraft's navigation system (e.g., GPS). Further, ADS-B messages may provide aircraft position, altitude, velocity, and other surveillance data to facilities that may use the information (e.g., for flight management), and the information may be continually broadcast for monitoring by appropriately equipped ground stations or aircraft. In some cases, an ADS-B message may include a flight identification (e.g., a flight number callsign or call sign), an aircraft address (e.g., a globally unique airframe code), a position (latitude/longitude), position integrity/accuracy (e.g., GPS horizontal protection limit), barometric and geometric altitudes, a vertical rate (e.g., a rate of climb/descent), a track angle and ground speed (e.g., velocity), an emergency indication (e.g., when an emergency code is selected), a special position identification (e.g., when an ADS-B DENT feature (i.e., a squawk ident) is selected), or any combination thereof.

However, one or more UAVs 215 may be unable to use ADS-B (e.g., due to limited available spectrum in ADS-B radio frequencies and a potentially high number of UAVs, where a relatively high number of UAVs may inundate resources in the ADS-B radio frequencies). As a result, UAVs and manned aircraft may use different systems for signaling location/vector information, and the two types of vehicles may be unable to directly communicate with one another as a result, leading to some potentially dangerous environments when both UAVs 215 and manned aircraft 220 are present. Thus, there is a need for techniques for efficiently identifying the presence of UASs that enables both UASs and manned aviation to coexist.

As described herein, a UAV 215 may send a BRID message in unicast or broadcast to one or more devices in a terrestrial cellular network, which may enable the identification of the UAV 215 by other devices and vehicles, namely the manned aircraft 220. For example, one or more wireless devices 205 (e.g., wireless device 205-a or 205-b) may receive one or more BRID messages from the UAV 215 via communication links 240 (e.g., communication links 240-a or 240-b), and the BRID message may include BRID information of the UAV 215. In one example, wireless device 205-a may receive the BRID message when the UAV 215 is located in coverage area 210-a associated with wireless device 205-a. Similarly, wireless device 205-b may receive the BRID message from the UAV 215. After receiving BRID information from the UAV 215, the wireless devices 205 may identify the BRID information for the UAV 215 that is included in the BRID message. The wireless device 205-a (or wireless device 205-b) may then broadcast information associated with the UAV 215 (e.g., based on the received BRID message), which may enable other aircraft to identify the position and velocity of the UAV 215. For instance, wireless device 205-a may broadcast the UAV information associated with the UAV 215 over communication link 255. As described herein, such techniques may enable the coexistence of the UAV 215 and one or more manned aircraft 220. That is, through the receipt of the UAV information broadcast by the wireless device, the manned aircraft 220 may know the position, location, proximity, and flight information associated with the UAV 215.

In aspects of the present disclosure, wireless devices 205 (e.g., wireless device 205-a and wireless device 205-b) may act as trusted receivers for BRID messages from one or more UAVs 215. For example, the wireless device 205-a (e.g., a base station or gNB of a 5G/NR system) may receive the BRID messages from one or more UAVs 215 and identify corresponding UAV information for the UAVs 215 to be broadcast to the manned aircraft 220.

In some examples, the wireless device 205-a may identify the UAV information by querying one or more network entities. For instance, the wireless device 205-a may not be equipped with a USS functionality, and may report, to a core network function (e.g., UFMS 225) in a mobile network operator (MNO) core network (e.g., core network 235), the BRID information received from the UAV 215. In some examples, the UFMS 225 may be an example of a core network function (e.g., a UAV flight management (UFM) network function (UFM NF) or other terminology). For instance, the wireless device 205-a may report the BRID information via communication link 245-a to a network node or network entity, such as the UFMS 225. Here, the wireless device 205-a may report the UAV identification information and location information (e.g., the UAV location information) from the received BRID message. In some cases, the transmission of the information to the network entity (e.g., UFMS 225) may be based on an absence of a context for the ID of UAV 215 (e.g., UAV aircraft ID or UAV type) at wireless device 205-a. That is, the wireless device 205-a may determine that it has not previously received messages from a particular UAV 215, and this may trigger the wireless device 205-a to query a network node for UAV information associated with the particular UAV 215. Once determining an absence of the context, wireless device 205-a may select a UFMS 225 based on the identification information of the UAV 215 and transmit a report to the UFMS 225 via communication link 245-a.

The UFMS 225 may provide UAV authorization, authentication, identification, and tracking through monitoring various unmanned traffic parameters (e.g., UAS ID, flight plan, flight permission, airspace management, surveillance/tracking capability, weather, conformance, contingency management, or recording/playback capability). In some aspects, the UFMS 225 may communicate with one or more UAVs 215, for example, over a communication link 245-b. In some cases, the UFMS 225 may select a USS 230 based on the identification information of a UAV 215. After selecting the USS 230, the UFMS 225 may transmit a request for information of UAV 215. The request for information of UAV 215 may include the BRID information received by the UFMS 225 (and by one or more wireless devices 205). Here, upon receiving the information from wireless device 205-a, the core network function (e.g., the UFMS 225) may report the BRID information to the USS 230 over a link 250. In such cases, UFMS 225 may retrieve the UAV information (e.g., actual UAV hardware ID or pilot information) from the USS 230. The USS 230 may facilitate exchanging data between flight management systems and industry deployments of UAVs and UAS s.

The UFMS 225 may generate a set of UAV information (e.g., ADS-B information or TIS-B information) to be sent by the wireless device 205-a based on the information received from the USS 230. Additionally or alternatively, the UFMS 225 may assign such information directly. That is, the UFMS 225 may be configured to include the UAV information associated with the UAV 215, and may provide the information to the wireless device 205-a after receiving the report from the wireless device 205-a (e.g., without querying the USS 230). In either case, the USS 230 may verify the BRID information provided by the wireless device 205-a, which may include the UAV location information with respect to the one or more UAVs 215. In such cases, the USS 230 may identify the UAV location information that the USS 230 has received, for example, via networked remote ID functionality. The USS 230 may confirm to the UFMS 225 the correctness or accuracy of the UAV location information included in the BRID information. Further, the USS 230 may confirm the validity of the location information contained in the BRID if such information is security protected (e.g., for anti-spoofing).

Additionally or alternatively, the authorization, creation of ADS-B information, and the like, may be performed by the USS 230, for example, upon receiving a request from the UFMS 225. In other cases, the USS 230 may perform such functions upon receiving an indication or reporting from the UFMS 225 that BRID information has been received and for which the UFMS 225 may not have any information. As such, the USS 230 and the UFMS 225 may each perform the functions of authorizing and generating the ADS-B information in response to the detection of BRID messages by a wireless device 205, and the USS 230 may further supplement the functionality of the UFMS 225 in cases where the UFMS 225 may not include various UAV information. That is, the USS 230 may transmit the ADS-B information or ADS-B related information (e.g., information related to ADS-B traffic) to the UFMS 225 based on the BRID information received from the wireless device 205-*a*.

The core network function or network entity (e.g., the UFMS 225) may confirm the correctness of the UAV location information to the wireless device 205-*a*. The wireless device 205-*a* may then generate and send broadcast messages including UAV information for each UAV for which the wireless device 205-*a* has received a BRID message. In some examples, the broadcast message may be an ADS-B message (e.g., having the same format or content of an ADS-B message). Additionally or alternatively, the broadcast message may be a TIS-B message. Here, TIS-B, which may supplement ADS-B air-to-air services, may provide situational awareness of all traffic known to an air traffic control system. In the present example, the TIS-B message may be provided by the wireless device 205-*a*, and may thus notify the manned aircraft 220 of the relevant UAV information for the one or more UAVs 215. In some cases, TIS-B may be an important service for an ADS-B-link in airspace, for example, where not all aircraft are transmitting ADS-B information. A ground TIS-B station may transmit surveillance target information on an ADS-B data link for targets unequipped with ADS-B or targets transmitting on another ADS-B link (i.e., TIS-B may include information about vehicles not equipped with ADS-B). In some cases, the TIS-B information may be derived from various available ground surveillance sources, including ground radars, multilateration (e.g., pseudo range multilateration) systems, and ADS-B systems. Thus, upon identifying the UAV information for the one or more UAVs 215, the wireless device 205-*a* may create a TIS-B message to be sent in broadcast, where the TIS-B message includes the UAV information about the visible UAVs. In such cases, the UAV information may include UAV IDs (e.g., as provided by the USS), which may include one or more of flight identification information (e.g., flight number callsign or call sign and a unique airframe code, such as an International Civil Aviation Organization (ICAO) 24-bit aircraft address) and location information of the UAV 215 (e.g., latitude/longitude, position integrity/accuracy (e.g., a GPS horizontal protection limit), barometric and geometric altitudes, vertical rate of climb/descent, track angle, and ground speed, and the like). In some examples, the UAV information may also include an emergency indication (e.g., emergency flag). In some examples, the UAV information that is broadcast by the wireless device 205-*a* may be included in a message according to the ADS-B format (e.g., used by the manned aircraft 220).

In some cases, the wireless device 205-*a* may identify the UAV information to be broadcast based on information stored or configured at the wireless device 205-*a*. For instance, the wireless device 205-*a* may be configured with information associated with one or more UAVs 215, and the base station may identify the UAV information to be broadcast based on the configuration. In some cases, the wireless device 205-*a* may determine whether to broadcast the UAV information based on various information about the one or more UAVs 215 or one or more manned aircraft 220. For example, the wireless device 205-*a* may identify the position or location of one or more manned aircraft 220 (e.g., based on receiving ADS-B messages), and the wireless device 205-*a* may determine whether to broadcast the UAV information (e.g., via an ADS-B or TIS-B message) based on a separation between the manned aircraft 220 and the UAV 215. In such cases, if the manned aircraft 220 and UAV 215 have a separation that satisfies a threshold, then the wireless device 205-*a* may broadcast the UAV information (which may be based on other factors or calculations performed by the wireless device 205-*a*). In other cases, the wireless device 205 may be configured to refrain from broadcasting the UAV information based on the separation between the UAV 215 and the manned aircraft 220. Additionally or alternatively, the wireless device 205 may be configured to refrain from broadcasting the UAV information based on the direction of travel of a UAV 215 and a manned aircraft 220, based on relatively velocities of the UAV 215 and the manned aircraft 220, or based on other parameters associated with one or both of the UAV 215 and the manned aircraft 220.

Additionally or alternatively, the wireless device 205-*a* may identify a type of the UAV 215 based on the BRID message received from the UAV 215. Based on the type of the UAV 215, the wireless device 205-*a* may determine whether to broadcast the UAV information. In other examples, the wireless device may be configured to broadcast the UAV information based on a location of the UAV 215. Here, if the UAV 215 is located within a particular area, geographic region or boundary, cell, or location, then the wireless device 205-*a* may determine to broadcast the UAV information. For instance, if the UAV 215 is located nearby an airport, then the wireless device 205-*a* may determine to broadcast the UAV information to the manned aircraft 220 based on this location. Further, the wireless device may be made aware of a flight plan (e.g., flight profile including one or more trajectories or one or more maneuvers) of one or more UAVs 215 (e.g., via the USS 230 or UFMS 225), and the wireless device 205-*a* may broadcast the UAV information to the manned aircraft 220 based on the location and timing of the flight plan associated with the one or more UAVs 215. In such cases, the USS 230 may proactively or dynamically send the flight plan information, via the UFMS 225, to one or more wireless devices 205.

In other aspects of the disclosure, the network node or core network function (e.g., the UFMS 225) may select a wireless device 205 for a specific geographic location that will transmit the TIS-B information for the UAVs 215 that have been detected (e.g., by one or more wireless devices 205) by receiving BRID information in a geographic area. Such techniques may avoid too many entities transmitting the TIS-B information to the manned aircraft 220, and the UFMS 225 may selectively or dynamically control which wireless devices 205 broadcast the UAV information associated with the detected UAVs 215.

In some examples, the USS 230 or the UFMS 225 may optionally exchange information with a TIS-B server 270. For example, a USS 230 may, for each set of BRID information received, select a TIS-B server 270 for a corresponding UAV 215. In such cases, the USS 230 may provide the TIS-B server 270 with the UAV information for network exposure function registration (which may include providing an identifier or address of the UFMS 225, a correlation ID, ADS-B identification information, or the like). In such cases, the correlation ID may be provided to the USS 230 by the UFMS 225. Based on the messaging between the USS 230 and the TIS-B server 270, the USS 230 may indicate information associated with the TIS-B server 270 when providing the UAV information to the UFMS 225 (e.g., responsive to a request for the UAV information). In some cases, the UFMS 225 may optionally provide the TIS-B server information to one or more wireless device 205.

The TIS-B server 270 may optionally subscribe to UAV information reporting by the one or more wireless devices 205 in wireless communications system 200. As an example, the TIS-B server 270 may transmit a subscription request to the UFMSs 225 for information that is reported for one or more UAVs 215, which may be based on a correlation ID (e.g., an identifier that correlates various devices and UAVs 215 with one another). In such cases, for each subscription request received from the TIS-B server 270, the UFMS 225 may use the correlation ID to retrieve a UAV ID and the corresponding wireless device 205 (e.g., between a particular UAV 215 and wireless device 205-a or 205-b). As such, the UFMS 225 may send, to wireless device 205-a (e.g., within the UAV information requested by the wireless device 205-a), a subscription request for information reporting by the wireless device 205-a for the UAV 215. Wireless device 205-a may confirm the subscription request with the UFMS 225, and may provide information reporting (e.g., via the UFMS 225) to the identified TIS-B server 270 based on the subscription request. In some examples, the TIS-B server 270 may transmit TIS-B information for one or more UAVs 215 to the manned aircraft 220.

Figure 3:
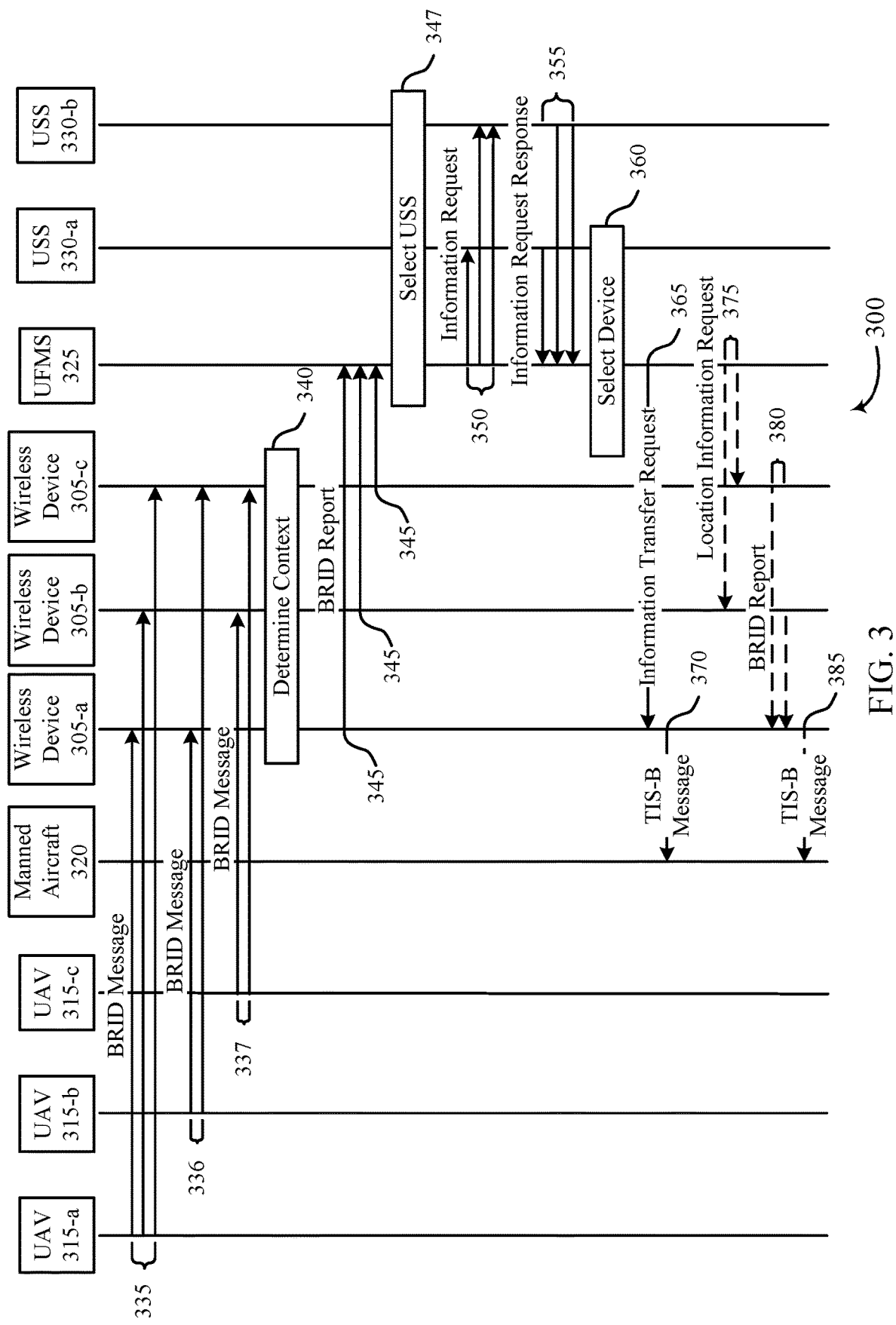
FIG. 3 illustrates an example of a process flow in a system that supports techniques for broadcasting flight information for UAVs in accordance with aspects of the present disclosure.

FIG. 3 illustrates an example of a process flow 300 in a system that supports techniques for broadcasting flight information for UAVs in accordance with aspects of the present disclosure. In some examples, process flow 300 may implement aspects of wireless communications systems 100 or 200. For example, the process flow 300 may include one or more UAVs 315 (e.g., a first UAV 315-a, a second UAV 315-b, and a third UAV 315-c) one or more manned aircraft 320, and various wireless devices 305 (e.g., a first wireless device 305-a, a second wireless device 305-b, a third wireless device 305-c). Each of the wireless devices 305 may be an example of a base station 105 or gNB, as described with reference to FIG. 1. In other examples, each wireless device 305 may be an example of a repeater device, or a UE 115, or another type of device. Further, the process flow 300 may include one or more network entities, such as a UFMS 325, and one or more USSs 330 (e.g., a first USS 330-a, a second USS 330-b). The devices described with respect to the process flow 300 may each be in communication with each other, for example, via wireless communications links or via wired communications links. The process flow 300 may illustrate techniques that enable the coexistence of UAVs 315 with manned aircraft 320 through the use of a terrestrial cellular network.

As described herein, one or more UAVs 315 may transmit BRID messages to wireless devices in a cellular network. For example, at 335, a first UAV 315-a may transmit BRID messages to one or more wireless devices 305. In particular, the first UAV 315-a may transmit BRID messages to each of the first wireless device 305-a, the second wireless device 305-b, and the third wireless device 305-c. Likewise, at 336, the second UAV 315-b may transmit one or more BRID messages to the first wireless device 305-a and the third wireless device 305-c, where the second wireless device 305-b may not be in range of the second UAV 315-b to receive the BRID messages. At 337, the third UAV 315-c may broadcast BRID messages to second wireless device 305-b and third wireless device 305-c. Here, the first wireless device 305-a may be out of range of the broadcast message from the third UAV 315-c, or the broadcast may not have been received or decoded correctly (e.g., due to interference).

Upon receipt of the BRID messages, each of the wireless devices 305 may identify UAV information for each of the UAVs 315 for which a BRID message was received. In such cases, the wireless devices 305 may be configured with information that enables the identification of the UAV information. Additionally or alternatively, the UAV information may be requested from one or more network functions, nodes, or entities. For instance, at 340, each wireless device 305 may determine whether a context (e.g., a UAV context) is stored for each UAV 315 that provided the BRID messages. Determining a status of the UAV context (e.g., determining whether the UAV 315 is new to the wireless device 305) may include verifying if a previous BRID message was received for each UAV 315 based on the UAV ID included in the received BRID message. As an example, the first wireless device 305-a may determine whether it has previously received BRID information associated with the first UAV 315-a, the second UAV 315-b, or the third UAV 315-c. Likewise, the second wireless device 305-b may determine whether it stores context information for the first UAV 315-a and the third UAV 315-c (e.g., based on previously-received messages from the first UAV 315-a and the third UAV 315-c). Further, as described herein, each UAV ID may be from a list of multiple UAV IDs (e.g., including cyclic shifts or modifications of a base ID) associated with a same UAV 315, and a wireless devices 305 may determine an absence or presence of the UAV context based on the list of UAV IDs.

In cases where a wireless device 305 does not have a context for one or more of the UAVs 315, the wireless device 305 may request UAV information from the UFMS 325. For instance, each wireless device 305 may determine an absence of a context for the ID for one or more of the UAVs 315, which may be based on identification information included in the received BRID message(s). Based on the determination, at 345, each wireless device 305 may transmit, to a network entity (e.g., UFMS 325), a report including the BRID information from the BRID messages based on the absence of the context (e.g., the UAVs 315 detected are newly identified at the respective wireless devices 305). Put another way, upon receiving the BRID information from a UAV 315 containing a UAV ID for which the wireless device 305 has no context (i.e., never received before), a wireless device 305 may report the BRID information to the UFMS 325. In some cases, the UFMS 325 may be selected by the wireless device 305 based on an ID of the UAV 315 for which it received a BRID message. As such, there may be multiple UFMS 325 or other network functions in a core network that may be selected based on the respective UAV IDs. The report sent to the UFMS 325 may include at least the ID of the UAV 315 and location information for the UAV 315 based on the BRID information.

At 347, the UFMS 325 may receive the BRID information including an ID of each UAV 315 and select one or more USSs 330 associated with the UAVs 315, which may be based on the ID of each UAV 315. Here, the UFMS 325 may select, for example, a base station (a wireless device 305) to act as a T-SIB emitter for the information of the UAV and provide, to the base station, UAV information obtained from a selected USS. As an example, a UAV ID for the first UAV 315-a may be associated with the first USS 330-a, whereas a UAV ID for the second UAV 315-b and a UAV ID for the third UAV 315-c may be associated with the second USS 330-b. As such, the UFMS 325 may select the corresponding USS 330, and at 350, may transmit an information request to the selected USSs 330. The information request may include a request for UAV information associated with one or more of the UAVs 315 (e.g., the first UAV 315-a, the second UAV 315-b, or the third UAV 315-c). The information request may the transmitted in order to retrieve the UAV information including, for example, an actual UAV hardware ID, Pilot Information, etc. from the respective USS 330. However, as described herein, the UFMS 325 may include functionality to obtain such information without querying the USSs 330.

At 355, the first USS 330-a and the second USS 330-b may each respond to the UFMS 325 with the requested UAV information associated with the UAVs. In some cases, the UAV information may include the UAV ID of each UAV 315, ADS-B identification information of the UAVs 315, and location reporting information for the UAVs 315. In some cases, the USSs 330 may each confirm a location of the respective UAVs 315. That is, the first USS 330-a may confirm the location of the first UAV 315-a, and the second USS 330-b may confirm the location of the second UAV 315-b and the third UAV 315-c. In some cases, the UAV ID of each UAV 315 may contain one or more UAV IDs, for example, in the case where a UAV ID sent in broadcast by the UAV may change over time (e.g., the UAV ID has a fixed portion and a portion where different pre-established values are used cyclically over time). Thus, a UAV ID for each UAV 315 may be included in a list of UAV IDs, where the list may provide two or more related IDs for the same UAV 315. As such, the list included in the UAV information for the UAV 315 may enable the UFMS 325 and one or more wireless devices 305 to identify the UAV 315, even in cases where the UAV ID changes (but is still associated with the same aircraft).

The ADS-B identification information included in the UAV information received/identified by the UFMS 325 may include, as an example, one or more of a flight identification information (such as a flight number callsign or call sign) and an aircraft address (such as an ICAO 24-bit Aircraft Address or globally unique airframe code). Further, the location reporting information in the UAV information received/identified by the UFMS 325 may include an indicating of how to convert the UAV location information in the BRID location information of the UAV 315 to an ADS-B format of location information (e.g., latitude/longitude, position integrity/accuracy (such as a GPS horizontal protection limit), barometric and geometric altitudes, vertical rate of climb/descent, track angle and ground speed). Such information may inform a wireless device 305 on how to transmit At 360, the UFMS 325 may select one or more wireless devices 305 to broadcast the UAV information. As an example, the UFMS 325 may select a same or different wireless device for broadcasting the UAV information for one or more of the UAVs 315. For instance, while the first wireless device may have received a BRID message from the first UAV 315-a, the first UAV 315-a may have since moved, and may be located closer to the second wireless device 305-b. As such, the UFMS 325 may select the second wireless device 305-b for broadcasting the UAV information. In other examples, the UFMS 325 may select the same wireless device 305 that received the BRID message(s) for broadcasting the UAV information (e.g., based on the location of one or both of the UAV 315 and wireless device 305). The UFMS 325 may also select the corresponding wireless device 305 based on other factors, such as a configuration of one or more of the wireless devices 305. In some examples, a USS 330 may provide information or may inform the UFMS 325 for selecting the corresponding wireless device 305 for broadcasting the UAV information.

Upon selecting a wireless device 305 for broadcasting the UAV information, the UFMS may transmit, at 365, the UAV information associated with the one or more UAVs 315. For example, the UFMS 325 may select the first wireless device 305-a for broadcasting the UAV information. In such cases, the first wireless device 305-a may receive the information regarding one or more UAVs 315 to be sent via broadcast (e.g., in a T-SIB message, an ADS-B message, or the like), where the UAV information may include the UAV ID of each of the UAV(s) 315, the ADS-B identification information of each of the UAV(s) 315, and location reporting information for each of the UAV(s) 315. That is, the information provided by the UFMS 325 may include the UAV ID, ADS-B identification information, and location reporting information for the first UAV 315-a, the second UAV 315-b, and the third UAV 315-c. Each request may further provide additional IDs of the UAV 315, which may be included in the received BRID message(s). As such, a wireless device 305 may detect that a received BRID message corresponds to a previously received BRID message (and a previously identified UAV 315), even in cases where the UAV 315 may switch to a different ID (e.g., a different UAV ID related to one or more other IDs associated with the same UAV 315). In some examples, the UFMS 325 may transmit the request for the wireless devices 305 to broadcast information related to the UAVs 215 after sensing some level of congestion or based on preprogrammed schedules of the UAVs 215.

At 370, the first wireless device 305-a may broadcast to one or more manned aerial vehicles (e.g., manned aircraft 320), the identified UAV information, which may indicate a presence of the UAV. In such cases, the first wireless device 305-a may generate a TIS-B message including the UAV information (e.g., in an ADS-B format), and broadcast the generated TIS-B message to the manned aircraft 320. Additionally or alternatively, the first wireless device 305-a may generate an ADS-B message and broadcast the generated ADS-B message to the manned aircraft 320. The manned aircraft 320 may accordingly identify the indicated UAVs 315, and may take precautions to avoid the UAVs 315. In some examples, the UAV information may be broadcast in a directional manner using beamforming. That is, the broadcast may be a narrow phase ray transmission pointing in a unique direction (e.g., in the direction of the manned aircraft 320).

In some examples, upon selecting the wireless device 305 (e.g., at 360), the UFMS 325 may request that information be transferred between or transmitted to other wireless devices 305. For instance, at 375, the UFMS 325 may transmit a request to the second wireless device 305-b or the third wireless device 305-c to transmit BRID information to the first wireless device 305-*a*. The request may include the IDs for the UAVs 315 for which information is to be transmitted. For example, a request to the second wireless device 305-*b* may include the ID of the first UAV 315-*a*, and ID of the second UAV 315-*b*, and an ID of the third UAV 315-*c*, whereas a request to the third wireless device 305-*c* may include an ID of the first UAV 315-*a* and the second UAV 315-*b*. Each request may further provide an ID of the wireless device 305 for which the information is to be sent to (e.g., an ID of the first wireless device 305-*a*). Each request from the UFMS 325 may further provide one or more additional IDs of the UAV 315, which may enable a receiving wireless device 305 to determine whether the wireless device 305 already has a context for the one or more UAVs 315 (e.g., based on previously-received BRID messages). Here, the additional IDs may enable the determination of the status of the context even in cases where the UAV may have switched its UAV ID (e.g., to a different or related ID).

In some examples, upon receiving information from the UFMS 325 (e.g., at 365 or at 375), a wireless device 305 may create a UAV context storing the UAV identities, for example, included in the signaling received from the UFMS 325. More generally, each time a wireless device 305 receives information associated with a UAV 315 (e.g., through a BRID message or otherwise), the wireless device 305 may store or update a context associated with that UAV 315 (which may be used for determining an absence or presence of the context, such as described with reference to 340). As such, the wireless device 305 may verify a presence of a previously stored context associated with the UAV 315 when receiving UAV information.

Accordingly, at 380, the second wireless device 305-*b* and the third wireless device 305-*c* may each transmit, to the first wireless device 305-*a*, the BRID information received in the BRID messages from the UAVs 315 and in accordance with the request from the UFMS 325. For example, the second wireless device 305-*b* may transmit the BRID information corresponding to the first UAV 315-*a* and the third UAV 315-*c*, and the third wireless device may transmit the BRID information corresponding to the first UAV 315-*a*, the second UAV 315-*b*, and the third UAV 315-*c*. Upon receiving the information from the other wireless devices 305, the first wireless device 305-*a* may broadcast corresponding UAV information (e.g., in a TIS-B message) to the manned aircraft 320 at 385.

Figure 4:
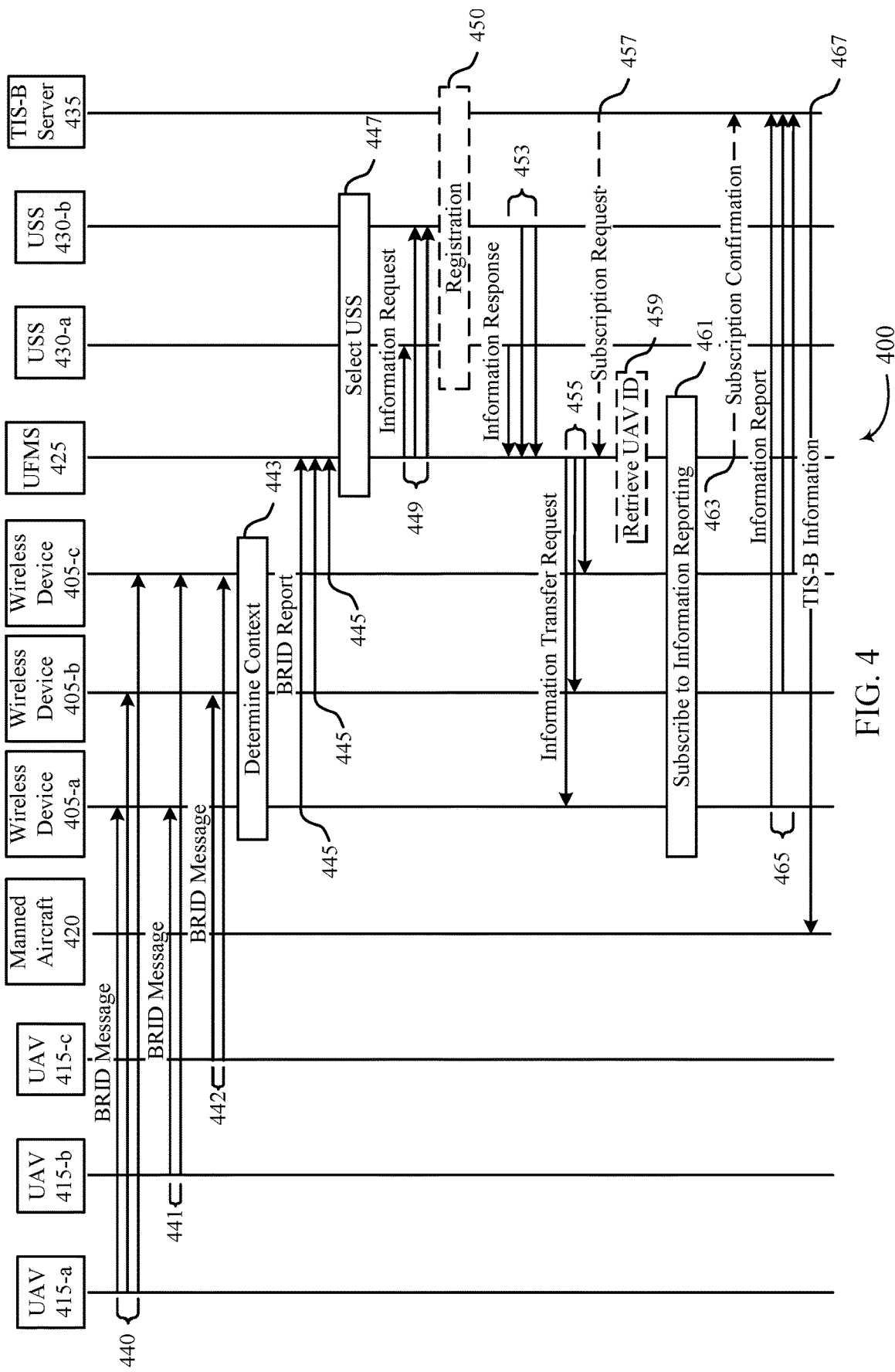
FIG. 4 illustrates an example of a process flow in a system that supports techniques for broadcasting flight information for UAVs in accordance with aspects of the present disclosure.

FIG. 4 illustrates an example of a process flow 400 in a system that supports techniques for broadcasting flight information for UAVs in accordance with aspects of the present disclosure. In some examples, the process flow 400 may implement aspects of wireless communications systems 100 or 200. For example, the process flow 300 may include one or more UAVs 415 (e.g., a first UAV 415-*a*, a second UAV 415-*b*, and a third UAV 415-*c*) one or more manned aircraft 420, and various wireless devices 405 (e.g., a first wireless device 405-*a*, a second wireless device 405-*b*, a third wireless device 405-*c*). Each of the wireless devices 405 may be an example of a base station 105 or gNB, as described with reference to FIG. 1. In other examples, each wireless device 405 may be an example of a repeater device, or a UE 115, or another type of device. Further, the process flow 400 may include one or more network entities, such as a UFMS 425, and one or more USSs 430 (e.g., a first USS 430-*a*, a second USS 430-*b*). The process flow may also include a TIS-B server 435, which may be an example of the TIS-B server 270 described with reference to FIG. 2. The devices described with respect to the process flow 400 may each be in communication with each other, for example, via wireless communications links or via wired communications links. The process flow 400 may illustrate techniques that enable the coexistence of UAVs 415 with manned aircraft 420 through the use of a terrestrial cellular network.

The one or more UAVs 415 may each broadcast BRID messages to the one or more wireless devices 405, which may obtain corresponding UAV information to be broadcast to one or more manned aircraft 420. It is noted that the aspects and operations of the process flow 400 from 440 through 447 may be the same or similar to the aspects and operation from 335 through 347 of the process flow 300 described with reference to FIG. 3. As such, these operations will not be repeated here for the sake of brevity.

At 447, upon selecting a USS 430 associated with each UAV ID from BRID messages received at the wireless devices 405, in some examples, the UFMS 425 may identify one or more correlation IDs, which may indicate a wireless device 405 and the corresponding UAV 415 that provided a BRID message to that wireless device 405. As such, at 449, when requesting the UAV information from the USSs 430, the UFMS 425 may provide the determined correlation ID(s) to each USS 430 based on the ID of the UAV 415 that is associated with the USS 430 and a wireless device 405.

At 450, each USS 430 may optionally perform network exposure function registration. In such cases, for each BRID received (e.g., from the UFMS 425 as part of the information request at 449), the first USS 430-*a* or the second USS 430-*b* may optionally select a TIS-B server 435 for the corresponding UAVs 415. Here, each USS 430 may provide the TIS-B server 435 with the UAV information for the network exposure function registration, where the UAV information may include an ID or address of the UFMS 425, one or more identified correlation IDs, ADS-B identification information, or the like.

At 453, upon providing the information to the UFMS 425, in addition to the requested UAV information, each USS 430 may optionally provide an indication of the selected TIS-B server 435. In some cases, if no TIS-B server 435 is selected, such indications may not be included in the UAV information provided to the UFMS 425. Instead, the USSs 430 may provide the UAV information including the UAV ID of each UAV 415, ADS-B identification information of the UAVs 415, and location reporting information for the UAVs 415. In some cases, the USSs 430 may each confirm a location of the respective UAVs 415. That is, first USS 430-*a* may confirm the location of the first UAV 415-*a*, and the second USS 430-*b* may confirm the location of the second UAV 415-*b* and the third UAV 415-*c*. In some cases, the UAV ID of each UAV 415 may contain one or more UAV IDs, for example, in the case where a UAV ID sent in broadcast by the UAV may change over time (e.g., the UAV ID has a fixed portion and a portion where different pre-established values are used cyclically over time). Thus, a UAV ID for each UAV 415 may be included in a list of UAV IDs, where the list may provide two or more related IDs for the same UAV 415. As such, the list included in the UAV information for the UAV 415 may enable the UFMS 425 and one or more wireless devices 405 to identify the UAV 415, even in cases where the UAV ID changes (but is still associated with the same aircraft).

At 455, the UFMS may transmit, the UAV information associated with the one or more UAVs 415. For example, the UFMS 425 may select the first wireless device 405-*a*, the second wireless device 405-*b*, and the third wireless device 405-*c* for broadcasting the UAV information. In such cases, each wireless device 405 may receive the information regarding one or more UAVs 415 to be sent via broadcast (e.g., in a T-SIB message, an ADS-B message, or the like), where the UAV information may include the UAV ID of each of the UAV(s) 415, the ADS-B identification information of each of the UAV(s) 415, and location reporting information for each of the UAV(s) 415. That is, the information provided by the UFMS 425 may include the UAV ID, ADS-B identification information, and location reporting information for the first UAV 415-a, the second UAV 415-b, and the third UAV 415-c. Further, the UAV information provided by the UFMS 425 may include an indication of an ID or address of the TIS-B server.

At 457, the TIS-B server 435 may optionally (e.g., if the TIS-B server 435 was selected by the UFMS 425 at 450) transmit a subscription request to the UFMS 425. Here, for each UAV 415, the TIS-B server may request to subscribe (e.g., via UFMS services) to UAV information reporting, which may be based on the correlation ID(s) provided by the UFMS 425.

At 459, in response to the subscription request, the UFMS 425 may, for each request, use the corresponding correlation ID to retrieve the UAV ID and the corresponding wireless devices 405.

At 461, the UFMS 425 may subscribe to information reporting for each UAV 415 that was indicated by the subscription request from the TIS-B server 435 (e.g., at 457). In such cases, the UFMS 425 may transmit the subscription request to each of the wireless devices 405 that were previously selected by the UFMS 425 (e.g., the first wireless device 405-a, the second wireless device 405-b, and the third wireless device 405-c). In such cases, each wireless device 405 may transmit, and the UFMS 425 may receive, a confirmation of the subscription request from the UFMS 425.

At 463, the UFMS 425 may confirm the subscription request from the TIS-B server 435. In such cases, the UFMS 425 may transmit one or more subscription confirmation messages to the TIS-B server.

At 465, each wireless device 405 may provide information reporting for the corresponding UAVs for which it is to provide UAV information for. In particular, the first wireless device 405-a may provide information reporting, which may include at least BRID information and location information, for the first UAV 415-a and the second UAV 415-b. The information may be transmitted to the TIS-B server 435 via the UFMS 425. Likewise, the second wireless device 405-b may provide information reporting for the first UAV 415-a and the third UAV 415-c (including BRID and location information) to the identified TIS-B server 435. In addition, the third wireless device 405-c may provide the BRID and location information for each of the UAVs 415 via the UFMS 425.

At 467, upon receiving the reporting information from the one or more wireless devices 405, the TIS-B server may have the UAV information broadcast for the UAVs 415 to one or more manned aerial vehicles, (e.g., the manned aircraft 420) via one or more of the devices. For example, the UAV information may be broadcast to the manned aircraft 420 by one or more of the wireless devices 405, or the UAV information may be broadcast to the manned aircraft 420 through other means. The UAV information may be broadcast using TIS-B messages or using ADS-B messages, or a combination thereof.

Figure 5:
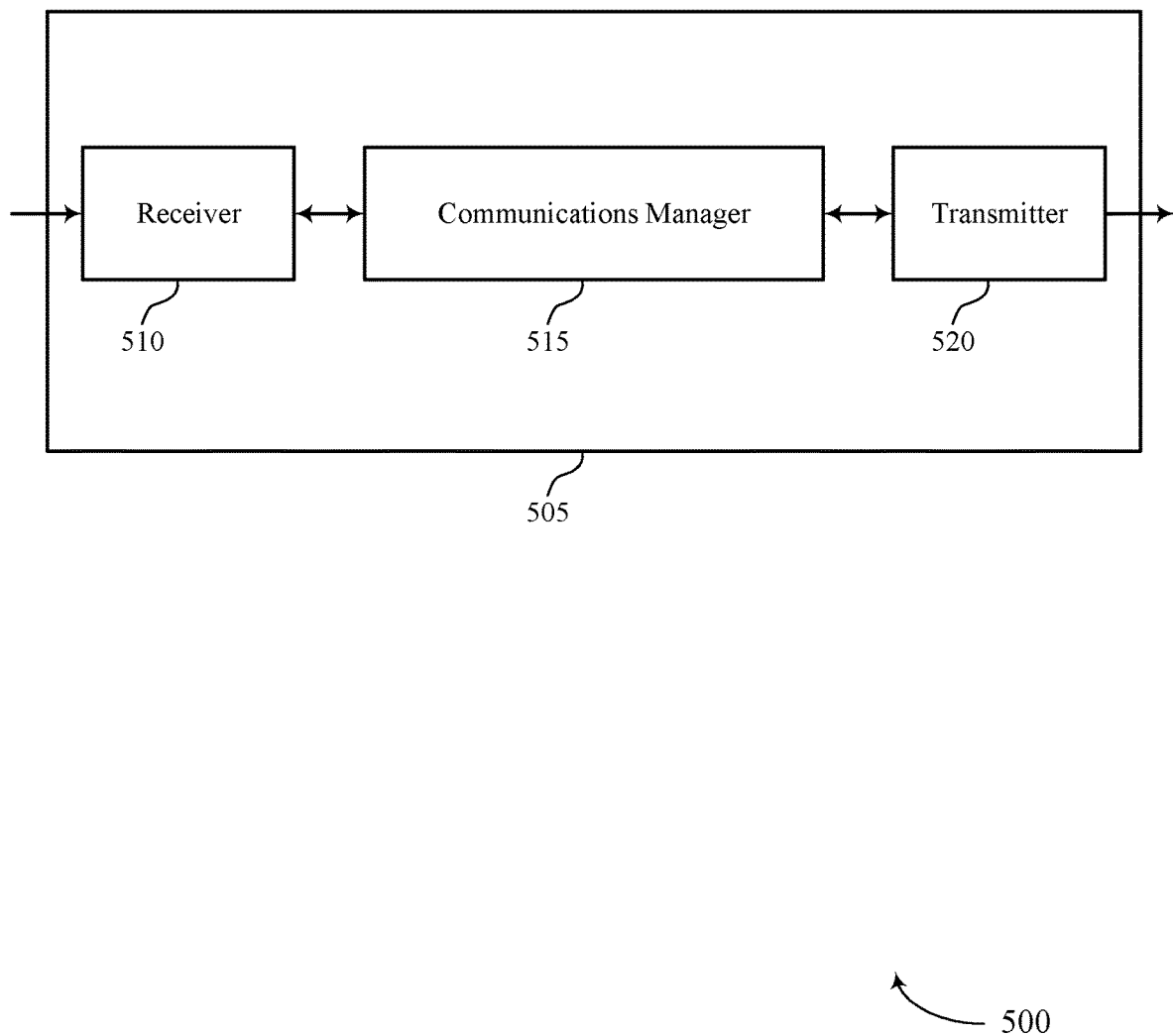
FIGS. 5 and 6 show block diagrams of devices that support techniques for broadcasting flight information for UAVs in accordance with aspects of the present disclosure.

FIG. 5 shows a block diagram 500 of a device 505 that supports techniques for broadcasting flight information for UAVs in accordance with aspects of the present disclosure. The device 505 may be an example of aspects of a UE 115, or base station 105, or repeating device, as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to techniques for broadcasting flight information for UAVs). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may receive a BRID message (e.g., from a UAV), the BRID message including BRID information including an ID of a UAV, identify UAV information for the UAV based on the BRID information and the ID of the UAV, and broadcast, to one or more manned aerial vehicles, the identified UAV information that indicates a presence of the UAV. The communications manager 515 may be an example of aspects of the communications manager 810 or 910 as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

Figure 6:
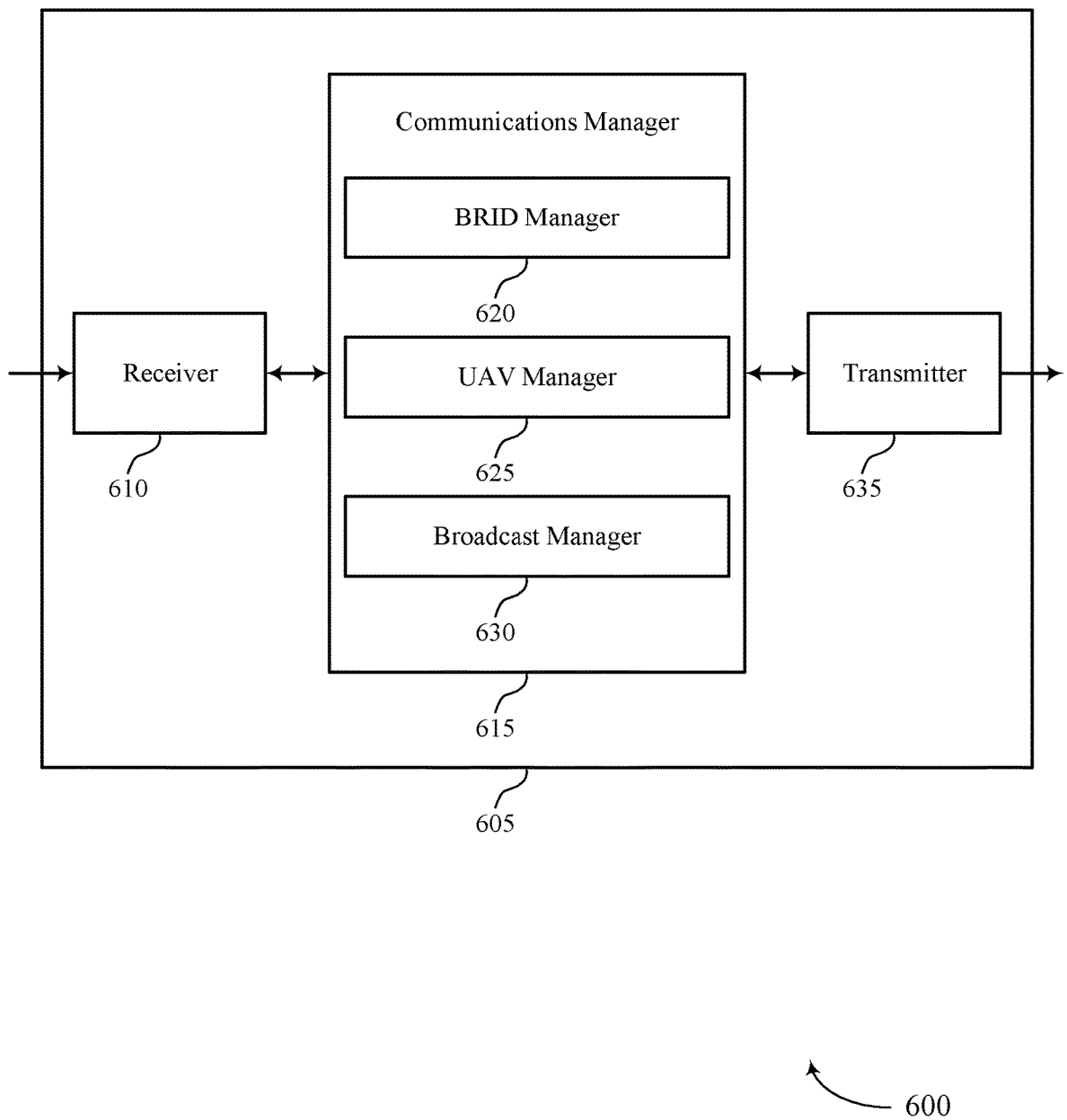

FIG. 6 shows a block diagram 600 of a device 605 that supports techniques for broadcasting flight information for UAVs in accordance with aspects of the present disclosure. The device 605 may be an example of aspects of a device 505, a UE 115, or a base station 105, or a repeating device, as described herein. The device 605 may include a receiver 610, a communications manager 615, and a transmitter 635. The device 605 may also include a processor. Each of these components may be in communication with one another (e.g., via one or more buses).

Receiver 610 may receive information such as packets, user data, or control information associated with various information channels (e.g., control channels, data channels, and information related to techniques for broadcasting flight information for UAVs). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a BRID manager 620, a UAV manager 625, and a broadcast manager 630. The communications manager 615 may be an example of aspects of the communications manager 810 or 910 as described herein.

The BRID manager 620 may receive a BRID message, the BRID message including BRID information including an ID of a UAV. The UAV manager 625 may identify UAV information for the UAV based on the BRID information and the ID of the UAV. The broadcast manager 630 may broadcast, to one or more manned aerial vehicles, the identified UAV information that indicates a presence of the UAV.

Transmitter 635 may transmit signals generated by other components of the device 605. In some examples, the transmitter 635 may be collocated with a receiver 610 in a transceiver module. For example, the transmitter 635 may be an example of aspects of the transceiver 820 or 920 as described with reference to FIGS. 8 and 9. The transmitter 635 may utilize a single antenna or a set of antennas.

Figure 7:
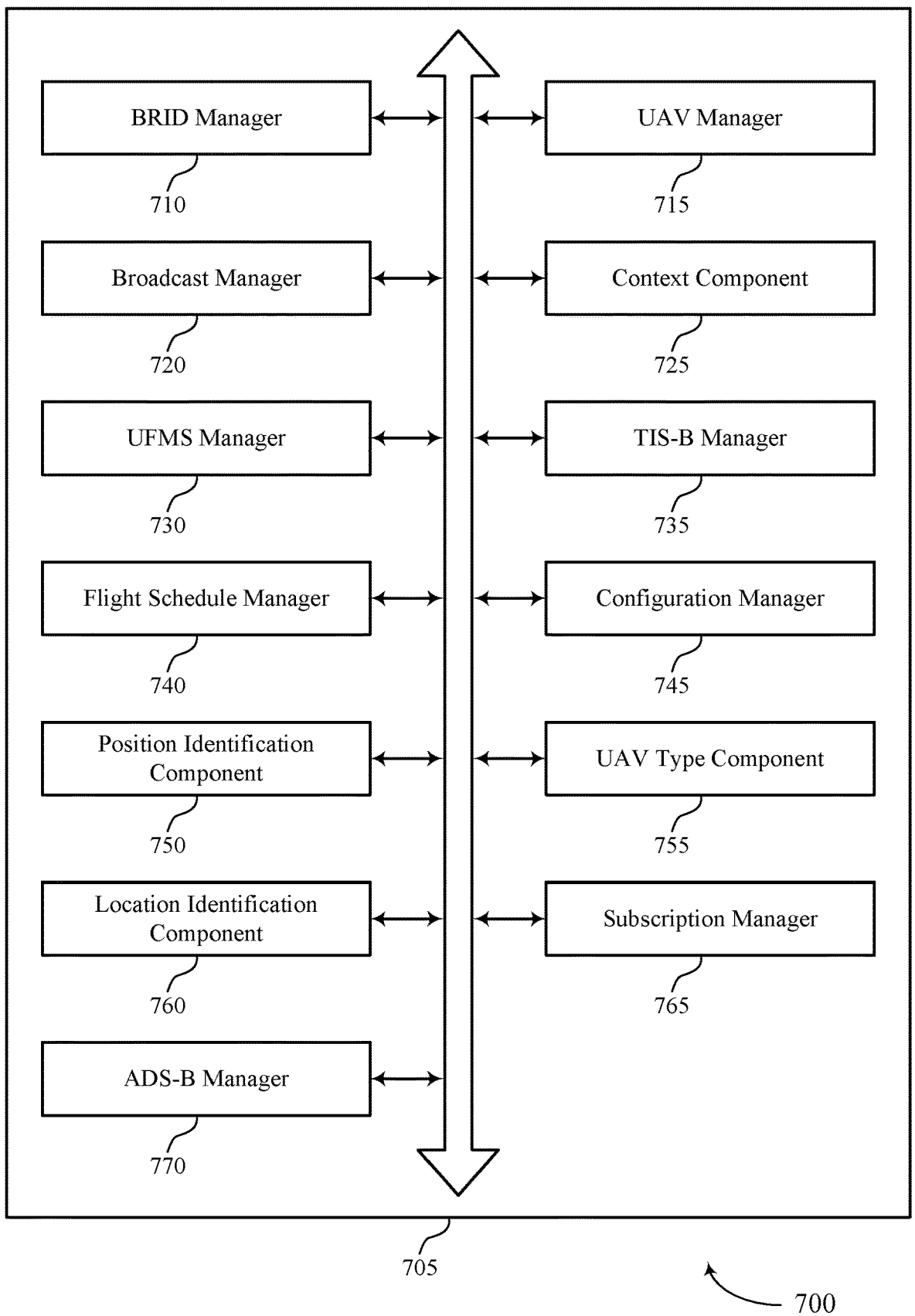
FIG. 7 shows a block diagram of a communications manager that supports techniques for broadcasting flight information for UAVs in accordance with aspects of the present disclosure.

FIG. 7 shows a block diagram 700 of a communications manager 705 that supports techniques for broadcasting flight information for UAVs in accordance with aspects of the present disclosure. The communications manager 705 may be an example of aspects of a communications manager 515, a communications manager 615, or a communications manager 810 described herein. The communications manager 705 may include a BRID manager 710, a UAV manager 715, a broadcast manager 720, a context component 725, a UFMS manager 730, a TIS-B manager 735, a flight schedule manager 740, a configuration manager 745, a position identification component 750, a UAV type component 755, a location identification component 760, a subscription manager 765, and an ADS-B manager 770. Each of these modules may communicate, directly or indirectly, with one another (e.g., via one or more buses).

The BRID manager 710 may receive a BRID message, the BRID message including BRID information including an ID of a UAV. In some examples, the BRID manager 710 may receive, from a second wireless device, second BRID information associated with a second UAV. In some examples, the BRID manager 710 may receive, from a network entity, a request to report the BRID information to a second wireless device. In some examples, the BRID manager 710 may transmit the BRID information to the second wireless device in accordance with the received request. In some cases, the request includes a configuration of a time duration for reporting the BRID information, a radio frequency for reporting the BRID information, one or more geofenced areas, a configuration indicating an ADS-B message broadcast rate for the UAV, or any combination thereof.

The UAV manager 715 may identify UAV information for the UAV based on the BRID information and the ID of the UAV. In some examples, the UAV manager 715 may receive the UAV information from the network entity in response to the report. In some examples, the UAV manager 715 may identify the UAV information based on a configuration.

The broadcast manager 720 may broadcast, to one or more manned aerial vehicles, the identified UAV information that indicates a presence of the UAV. In some examples, the broadcast manager 720 may broadcast the TIS-B message to the one or more manned aerial vehicles. In some examples, the broadcast manager 720 may broadcast the information associated with the one or more UAVs in accordance with the request. In some examples, the broadcast manager 720 may broadcast the ADS-B message to the one or more manned aerial vehicles. In some examples, the broadcast manager 720 may broadcast UAV information associated with the second UAV based on the second BRID information. In some cases, the first wireless device includes a base station, or a user equipment, or a repeater device.

The context component 725 may determine an absence of a context for the ID of the UAV at the first wireless device. The UFMS manager 730 may transmit, to a network entity, a report including the BRID information based on the absence of the context. In some examples, the UFMS manager 730 may select the network entity based on the ID of the UAV. In some examples, the UFMS manager 730 may select the network entity (e.g., the UFMS) based on a location of the UAV, or a traffic management authority (e.g., a UAV traffic management authority) associated with the location of the UAV, or any combination thereof. In some examples, the UFMS manager 730 may receive, from a network entity, a request to broadcast information associated with one or more UAVs, the request including the information to be broadcast. In some cases, the report includes the ID of the UAV and location information for the UAV based on the BRID information.

In some cases, the information associated with the one or more UAVs includes an ID of each UAV of the one or more UAVs, ADS-B identification information for each UAV of the one or more UAVs, location information for each UAV of the one or more UAVs, or any combination thereof. In some cases, a first ID associated with a first UAV of the one or more UAVs includes a list of one or more UAV identifiers, the list including a set of related identifiers for the first UAV. In some examples, a first identify associated with a first UAV of the one or more UAVs includes an identifier embedded in a broadcast-signing digital certificate, or a transform of the digital certificate, or an identifier generated from a cryptographic hash, or any combination thereof. In some cases, the ADS-B identification information for each UAV includes a flight number, a call sign, an aircraft address, an airframe code, or any combination thereof. In some examples, the ADS-B identification information for each UAV is generated based on the ID of each UAV. That is, the ADS-B identification information may be generated wholly, or in part, from the UAV ID.

In some cases, the location information for each UAV includes instructions for converting location information included in BRID information for each UAV into an ADS-B format, the ADS-B format including a latitude, a longitude, a position integrity, a position accuracy, GPS information, an altitude, a climb rate, a descent rate, a track angle, a ground speed, or any combination thereof. In some cases, the network entity includes a UFMS.

The TIS-B manager 735 may generate a TIS-B message including the UAV information. In some cases, the information associated with the one or more UAVs includes an indication of a TIS-B server.

The flight schedule manager 740 may identify, from the information associated with the one or more UAVs, a flight schedule for the one or more UAVs, the flight schedule indicating a respective planned trajectory of the one or more UAVs, where broadcasting the information is based on one or both of the identified flight schedule or planned trajectory and detecting at least one BRID message from each of the one or more UAVs.

The configuration manager 745 may receive a configuration for identifying the UAV information. In some cases, the configuration includes a set of parameters associated with one or more USSs, where the UAV information is identified based on the set of parameters.

The position identification component 750 may identify a position of a manned aircraft based on detecting one or more ADS-B messages. In some examples, the position identification component 750 may determine, in accordance with the configuration, that a separation between the manned aircraft and the UAV satisfies a threshold based on the position, direction of travel, or velocity of the manned aircraft, where broadcasting the UAV information is based on the separation satisfying the threshold.

The UAV type component 755 may identify, in accordance with the configuration, a type of the UAV based on the BRID information, where the UAV information is broadcast based on the type of the UAV.

The location identification component 760 may identify, in accordance with the configuration, a location or track (e.g., flight path) of the UAV based on the BRID information, where broadcasting the UAV information is based on the UAV being located within a region or cell associated with the first wireless device. In some examples, the location identification component 760 may determine the location of the UAV based on GPS information, triangulation information, one or more received signal strength indicators (RSSIs) (e.g., from the cellular infrastructure or cellular network), or any combination thereof. In some cases, determining the location of the UAV includes identifying location information of the UAV, augmenting the location information of the UAV, verifying the location information of the UAV, or any combination thereof.

The subscription manager 765 may receive, from the network entity, a subscription request for information reporting associated with one or more UAVs. In some examples, the subscription manager 765 may transmit a confirmation of the subscription request to the network entity. In some examples, the subscription manager 765 may transmit, via the network entity, an information report to a TIS-B server based on the subscription request, the information report including one or more of BRID information or GPS information associated with the one or more UAVs. The ADS-B manager 770 may generate an ADS-B message including the UAV information.

Figure 8:
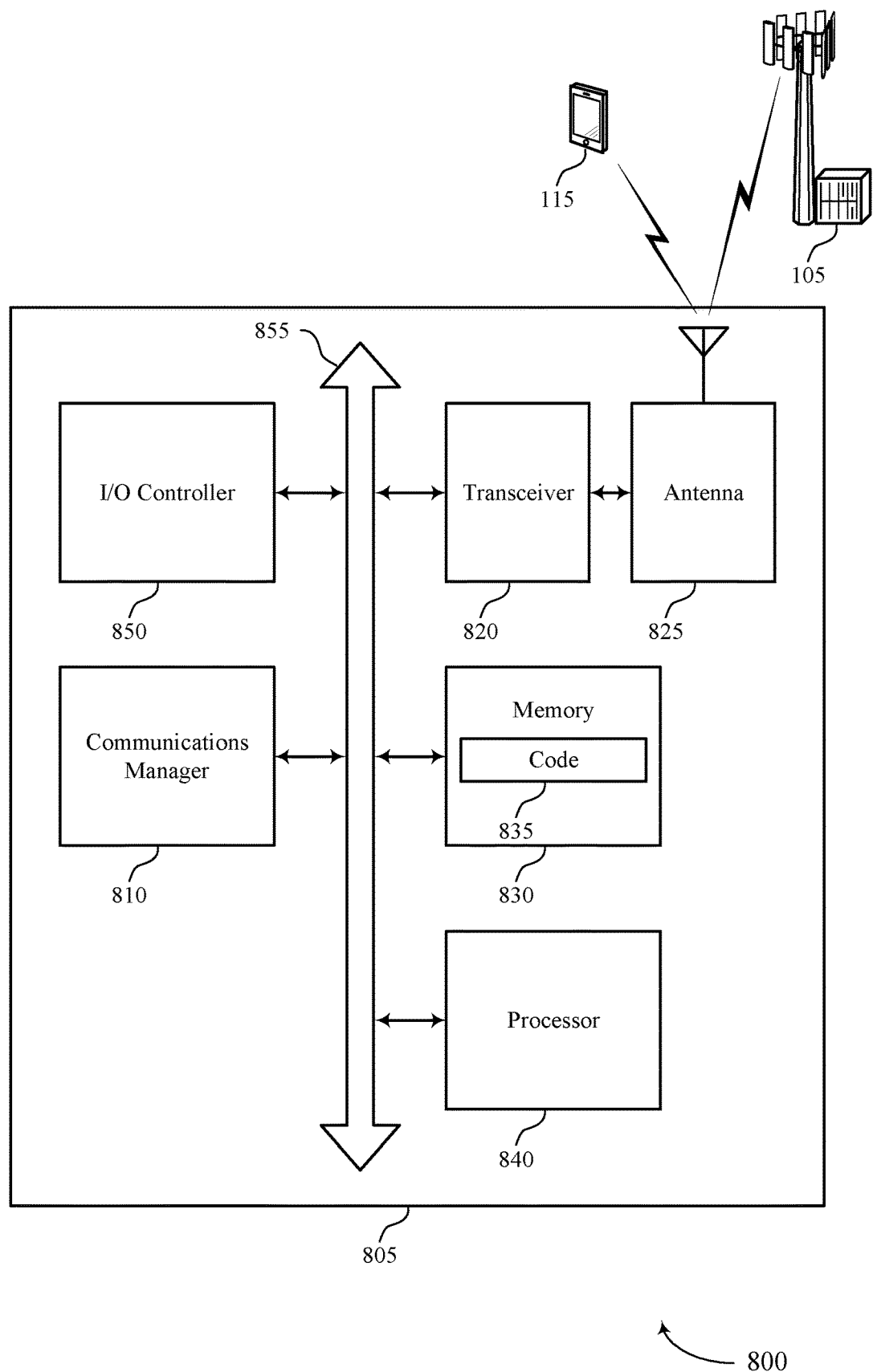
FIG. 8 shows a diagram of a system including a user equipment (UE) that supports techniques for broadcasting flight information for UAVs in accordance with aspects of the present disclosure.

FIG. 8 shows a diagram of a system 800 including a device 805 that supports techniques for broadcasting flight information for UAVs in accordance with aspects of the present disclosure. The device 805 may be an example of or include the components of device 505, device 605, or a UE 115 as described herein. Additionally or alternatively, the device 805 may be an example of a repeater device (e.g., a wireless repeater) or another device, as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may receive a BRID message, the BRID message including BRID information including an ID of a UAV, identify UAV information for the UAV based on the BRID information and the ID of the UAV, and broadcast, to one or more manned aerial vehicles, the identified UAV information that indicates a presence of the UAV.

Transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include random-access memory (RAM), read-only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for broadcasting flight information for UAVs).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
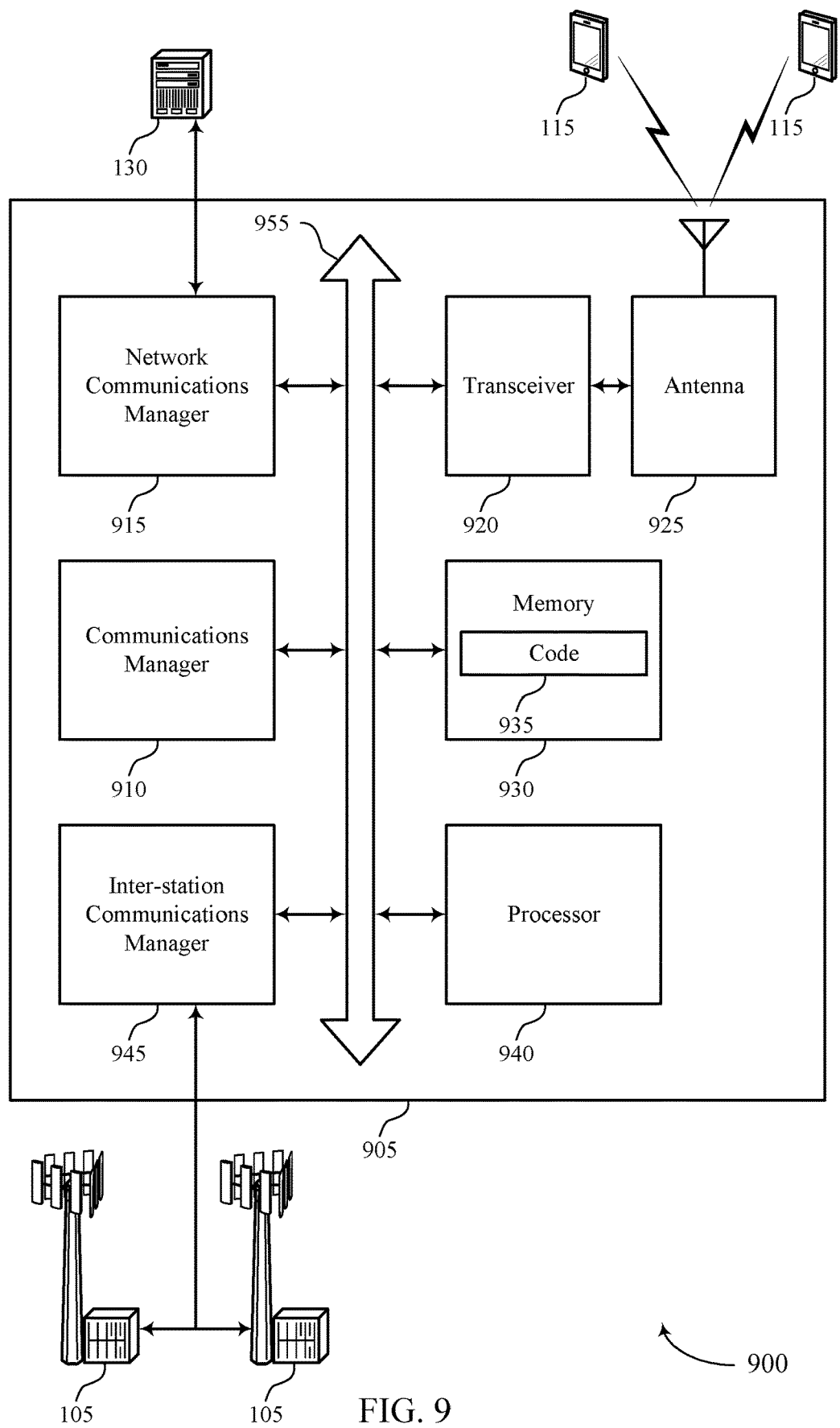
FIG. 9 shows a diagram of a system including a base station that supports techniques for broadcasting flight information for UAVs in accordance with aspects of the present disclosure.

FIG. 9 shows a diagram of a system 900 including a device 905 that supports techniques for broadcasting flight information for UAVs in accordance with aspects of the present disclosure. The device 905 may be an example of or include the components of device 505, device 605, or a base station 105 as described herein. Additionally or alternatively, the device 905 may be an example of a repeater device (e.g., a wireless repeater) or another device, as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may receive a BRID message, the BRID message including BRID information including an ID of a UAV, identify UAV information for the UAV based on the BRID information and the ID of the UAV, and broadcast, to one or more manned aerial vehicles, the identified UAV information that indicates a presence of the UAV.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for broadcasting flight information for UAVs).

Inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
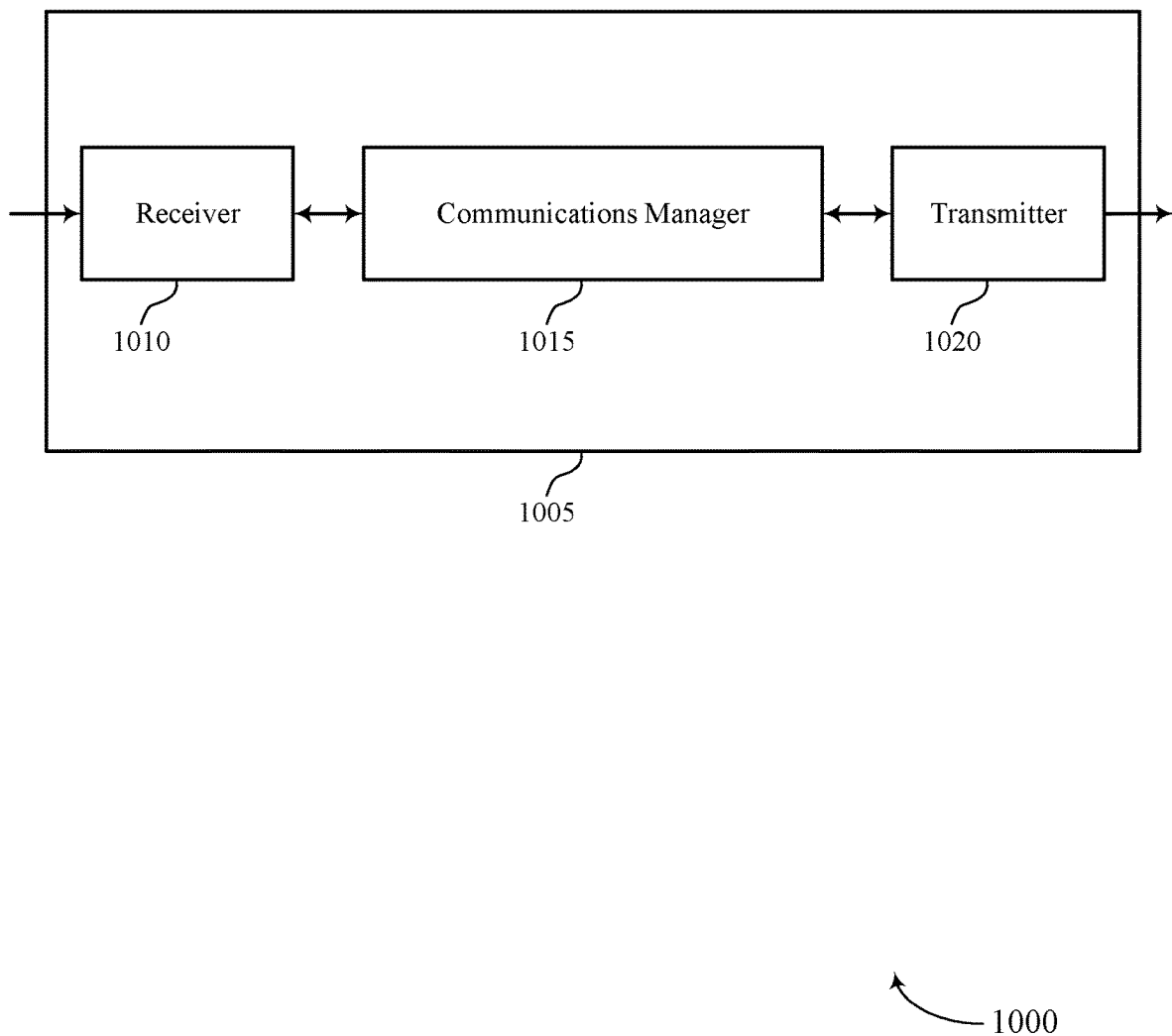
FIGS. 10 and 11 show block diagrams of devices that support techniques for broadcasting flight information for UAVs in accordance with aspects of the present disclosure.

FIG. 10 shows a block diagram 1000 of a device 1005 that supports techniques for broadcasting flight information for UAVs in accordance with aspects of the present disclosure. The device 1005 may be an example of aspects of a network entity as described herein. For instance, device 1005 may be an example of a network node, a UFMS, a server, or other network device or function, as described herein. Additionally or alternatively, the device 1005 may be an example of a USS, as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for broadcasting flight information for UAVs). Information may be passed on to other components of the device 1005. The receiver 1010 may be an example of aspects of the transceiver 1520 described with reference to FIG. 15. The receiver 1010 may utilize a single antenna or a set of antennas.

The communications manager 1015 may receive, from a first wireless device, BRID information including an ID of a UAV, select a USS based on the ID of the UAV, receive the UAV information from the selected USS in response to the request, and transmit, to the selected USS, a request for UAV information associated with the UAV.

Additionally or alternatively, the communications manager 1015 may receive, from a network entity, a request for UAV information associated with a UAV, the request including BRID information including an ID of the UAV, determine the UAV information based on the BRID information, and transmit the UAV information to the network entity. The communications manager 1015 may be an example of aspects of the communications manager 1510 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with the receiver 1010 in a transceiver module. For example, the transmitter 1020 may be an example of aspects of the transceiver 1520 described with reference to FIG. 15. The transmitter 1020 may utilize a single antenna or a set of antennas.

Figure 11:
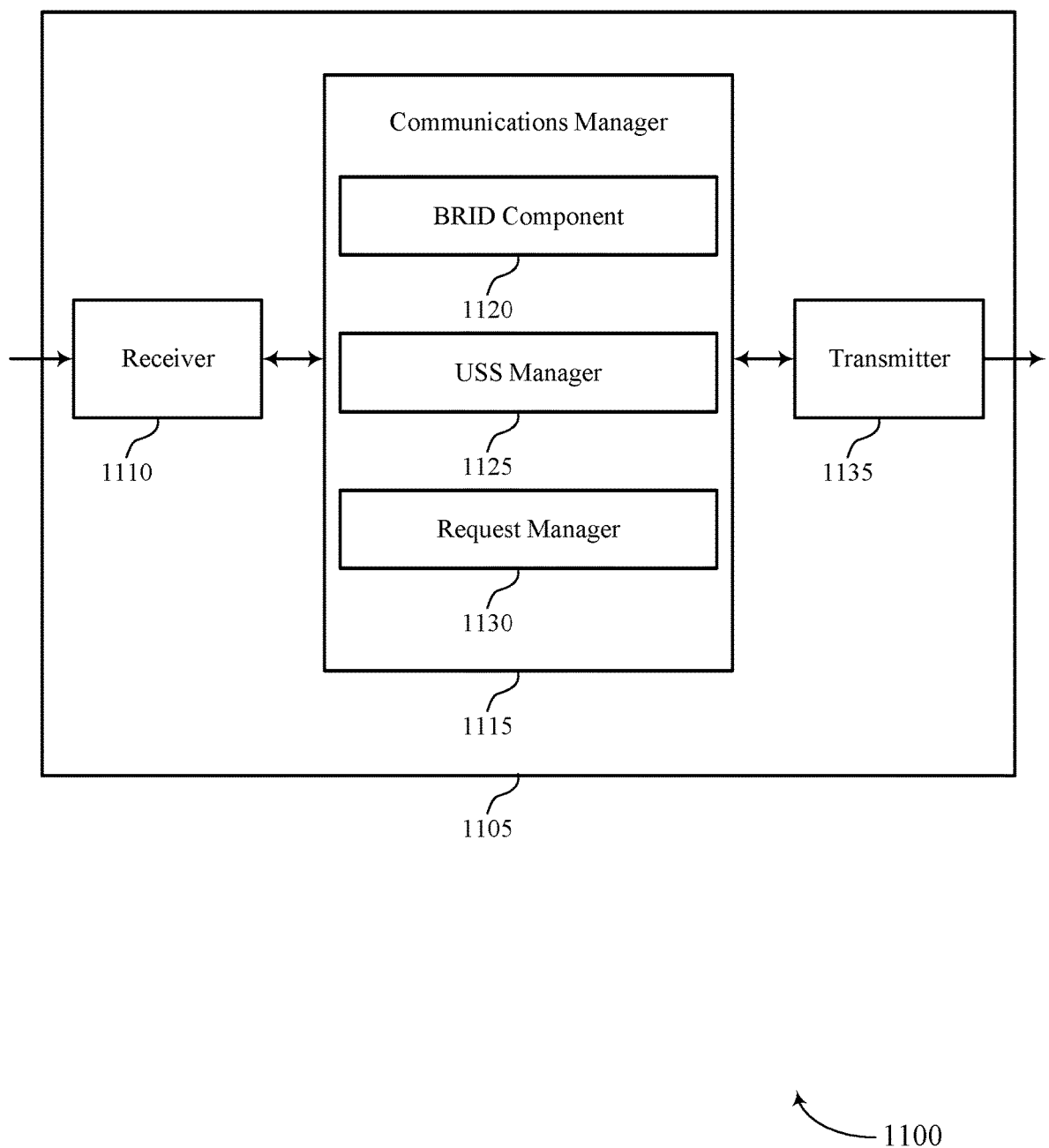

FIG. 11 shows a block diagram 1100 of a device 1105 that supports techniques for broadcasting flight information for UAVs in accordance with aspects of the present disclosure. The device 1105 may be an example of aspects of a device 1005 or a network entity as described herein. In some cases, the device 1105 may be an example of a UFMS or other network device or function as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for broadcasting flight information for UAVs). Information may be passed on to other components of the device 1105. The receiver 1110 may be an example of aspects of the transceiver 1520 described with reference to FIG. 15. The receiver 1110 may utilize a single antenna or a set of antennas.

The communications manager 1115 may be an example of aspects of the communications manager 1015 as described herein. The communications manager 1115 may include a BRID component 1120, a USS manager 1125, and a request manager 1130. The communications manager 1115 may be an example of aspects of the communications manager 1510 described herein.

The BRID component 1120 may receive, from a first wireless device, BRID information including an ID of a UAV. The USS manager 1125 may select a USS based on the ID of the UAV and receive the UAV information from the selected USS in response to the request. The request manager 1130 may transmit, to the selected USS, a request for UAV information associated with the UAV.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1520 described with reference to FIG. 15. The transmitter 1135 may utilize a single antenna or a set of antennas.

Figure 12:
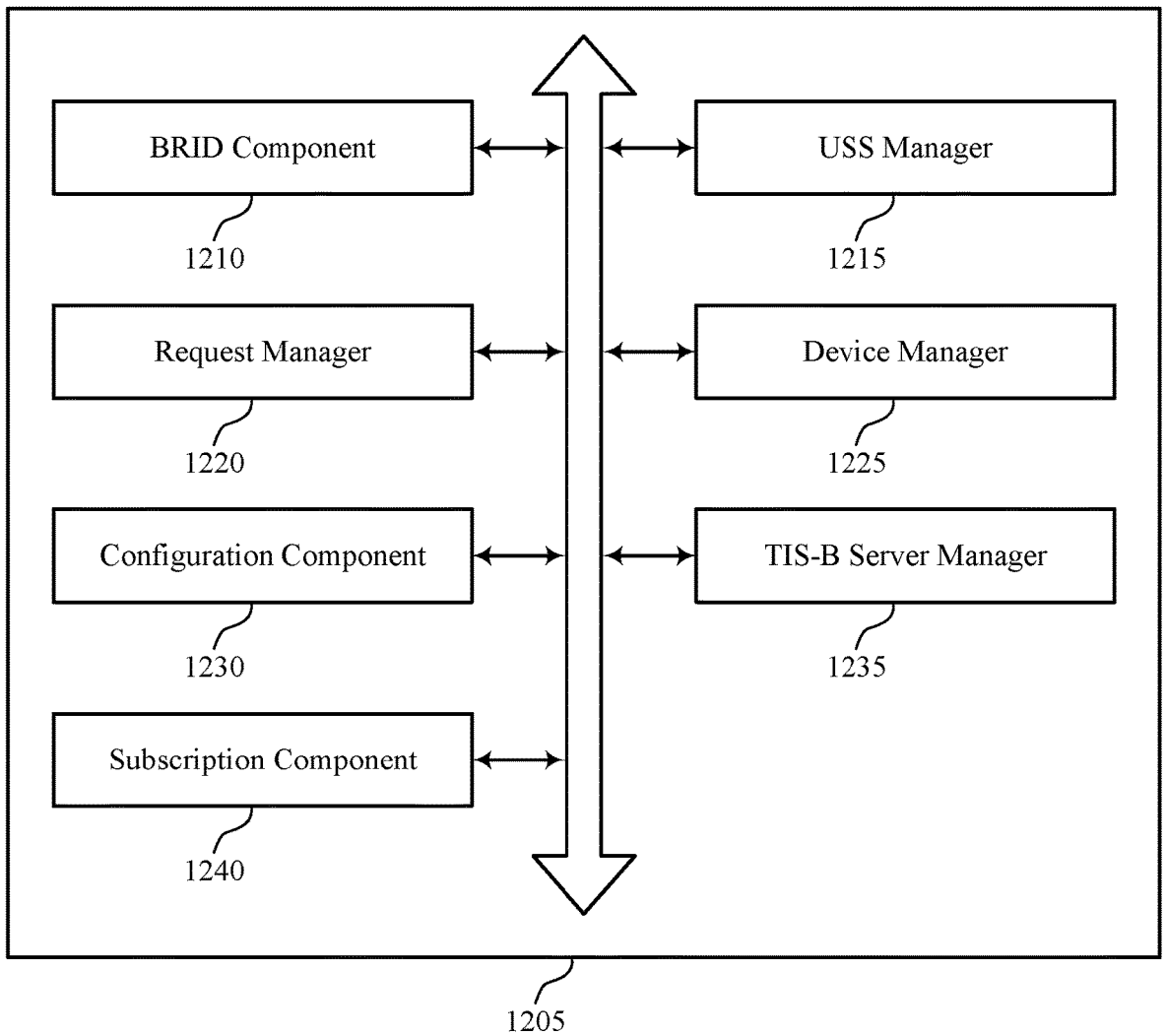
FIG. 12 shows a block diagram of a communications manager that supports techniques for broadcasting flight information for UAVs in accordance with aspects of the present disclosure.

FIG. 12 shows a block diagram 1200 of a communications manager 1205 that supports techniques for broadcasting flight information for UAVs in accordance with aspects of the present disclosure. The communications manager 1205 may be an example of aspects of a communications manager 1015, a communications manager 1115, or a communications manager 1510 described herein. The communications manager 1205 may include a BRID component 1210, a USS manager 1215, a request manager 1220, a device manager 1225, a configuration component 1230, a TIS-B server manager 1235, and a subscription component 1240. Each of these modules may communicate, directly or indirectly, with one another (e.g., via one or more buses).

The BRID component 1210 may receive, from a first wireless device, BRID information including an ID of a UAV. In some cases, the first wireless device includes a base station, or a UE, or a repeater device.

The USS manager 1215 may select a USS based on the ID of the UAV. In some examples, the USS manager 1215 may receive the UAV information from the selected USS in response to the request. In some examples, the USS manager 1215 may receive, from the USS, an indication of a flight schedule for one or more UAVs (e.g., indicating a planned trajectory of the one or more UAVs). In some examples, the USS manager 1215 may receive, as part of the UAV information, an indication of a TIS-B server. In some cases, the UAV information includes the ID of the UAV, ADS-B identification information for the UAV, location information for the UAV, or any combination thereof.

The request manager 1220 may transmit, to the selected USS, a request for UAV information associated with the UAV. In some examples, the request manager 1220 may transmit, to the first wireless device, a request to report at least the BRID information to a second wireless device based on a location of the UAV, the request including a configuration of a time duration for reporting the BRID information, a radio frequency for reporting the BRID information, or any combination thereof.

The device manager 1225 may select a second wireless device to broadcast a TIS-B message including the UAV information based on a location of the UAV information with relation to the second wireless device. In some examples, the device manager 1225 may transmit, to the second wireless device, a request to broadcast the UAV information using the TIS-B message. In some examples, the device manager 1225 may select one or more wireless devices for broadcasting UAV information for the one or more UAVs based on the flight schedule or planned UAV trajectory, or any combination thereof. In some cases, the second wireless device is different from the first wireless device. In some cases, the second wireless device is the same as the first wireless device.

The configuration component 1230 may transmit, to the first wireless device, a configuration for identifying the UAV information. The TIS-B server manager 1235 may transmit the indication of the TIS-B server to the first wireless device. In some examples, the TIS-B server manager 1235 may transmit the reporting information to the TIS-B server based on the first subscription request.

The subscription component 1240 may receive, from the TIS-B server, a first subscription request for information reporting associated with one or more UAVs, where the first subscription request includes a correlation identifier for the one or more UAVs. In some examples, the subscription component 1240 may identify one or more UAV identifiers and a wireless device corresponding to the one or more UAV identifiers based on the correlation identifier.

In some examples, the subscription component 1240 may transmit, to the wireless device, a second subscription request for information reporting associated with the one or more UAV identifiers based on the first subscription request. In some examples, the subscription component 1240 may receive a confirmation of the second subscription request from the wireless device. In some examples, the subscription component 1240 may transmit a confirmation of the first subscription request to the TIS-B server. In some examples, the subscription component 1240 may receive, from the wireless device and based on the second subscription request, reporting information including an indication of BRID information or GPS information, or both, that is associated with the one or more UAV identifiers.

Figure 13:
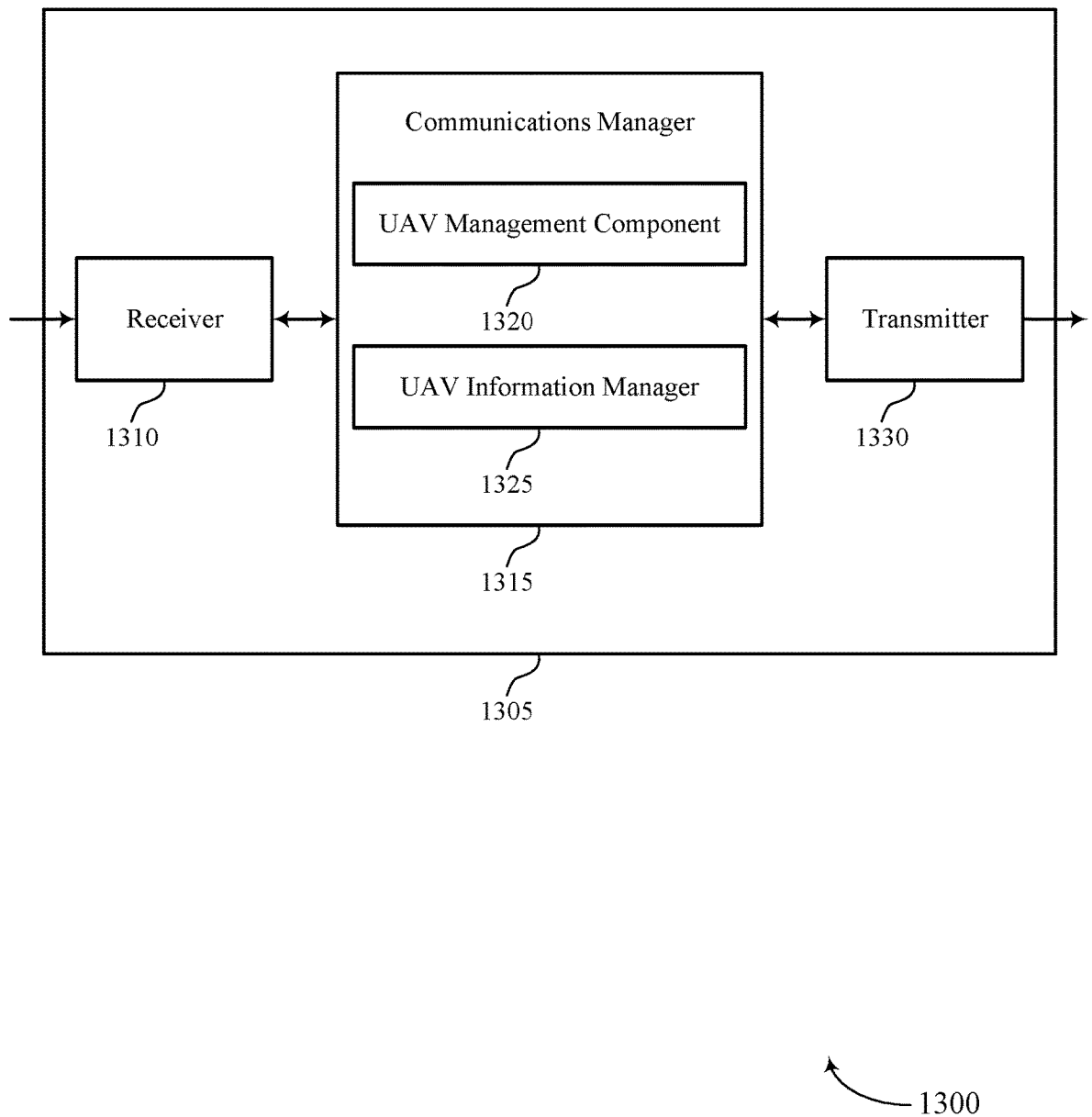
FIG. 13 shows block diagrams of a device that support techniques for broadcasting flight information for UAVs in accordance with aspects of the present disclosure.

FIG. 13 shows a block diagram 1300 of a device 1305 that supports techniques for broadcasting flight information for UAVs in accordance with aspects of the present disclosure. The device 1305 may be an example of aspects of a device 1005 or a network entity as described herein. In some examples, the device may be an example of a USS as described herein. The device 1305 may include a receiver 1310, a communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for broadcasting flight information for UAVs). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1015 as described herein. The communications manager 1315 may include a UAV management component 1320, and a UAV information manager 1340. The communications manager 1315 may be an example of aspects of the communications manager 1510 described herein.

The UAV management component 1320 may receive, from a network entity (e.g., a UFMS or other server or network node), a request for UAV information associated with a UAV, the request including BRID information including an ID of the UAV. The UAV information manager 1325 may determine the UAV information based on the BRID information and transmit the UAV information to the network entity.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
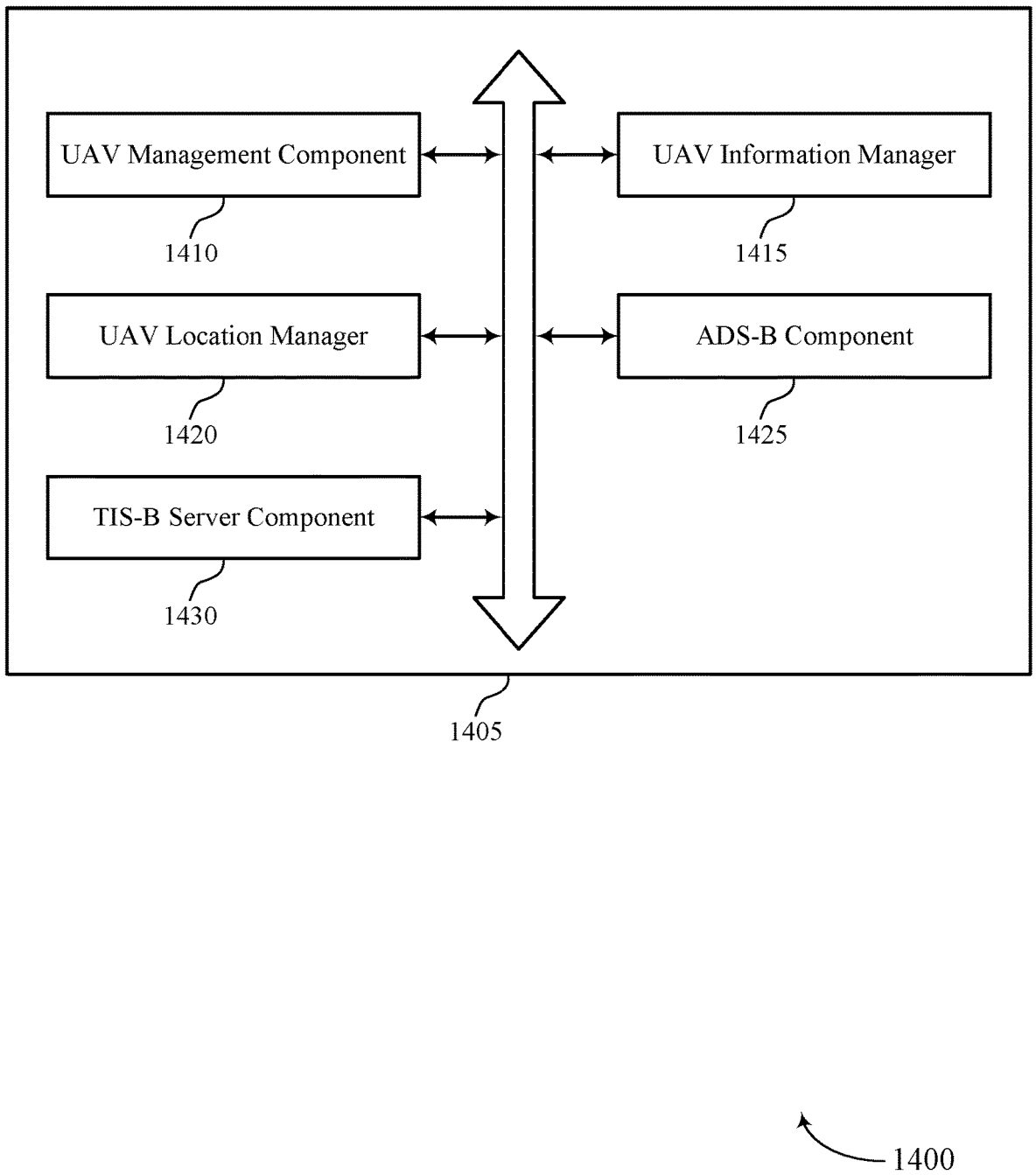
FIG. 14 shows a block diagram of a communications manager that supports techniques for broadcasting flight information for UAVs in accordance with aspects of the present disclosure.

FIG. 14 shows a block diagram 1400 of a communications manager 1405 that supports techniques for broadcasting flight information for UAVs in accordance with aspects of the present disclosure. The communications manager 1405 may be an example of aspects of a communications manager 1015, a communications manager 1315, or a communications manager 1510 described herein. The communications manager 1405 may include a UAV management component 1410, a UAV information manager 1415, a UAV location manager 1420, an ADS-B component 1425, and a TIS-B server component 1430. Each of these modules may communicate, directly or indirectly, with one another (e.g., via one or more buses).

The UAV management component 1410 may receive, from a network entity (e.g., a UFMS or other entity, function, or server within a core network), a request for UAV information associated with a UAV, the request including BRID information including an ID of the UAV. In some cases, the request from the network entity includes a request for relaying detected ADS-B information representation in one or more traffic management systems (e.g., UAV traffic management systems), the detected ADS-B information being received from a manned aircraft by the network entity.

The UAV information manager 1415 may determine the UAV information based on the BRID information. In some examples, the UAV information manager 1415 may transmit the UAV information to the network entity. In some examples, the UAV information manager 1415 may transmit a confirmation of the location to the network entity. In some examples, the UAV information manager 1415 may transmit, to the network entity, an indication of the one or more flight profiles.

In some examples, the UAV information manager 1415 may transmit, to the selected TIS-B server, the UAV information, an ID of the network entity, an address of the network entity, a correlation identifier, ADS-B identification information, or any combination thereof. In some examples, the UAV information manager 1415 may transmit, to the network entity, an indication of the selected TIS-B server.

The UAV location manager 1420 may determine a location of the UAV based on the BRID information. In some examples, the UAV location manager 1420 may identify one or more flight profiles including flight schedules for one or more UAVs, one or more trajectories for the one or more UAVs, one or more maneuvers for the one or more UAVs, or any combination thereof. The ADS-B component 1425 may transmit ADS-B related information based on the BRID information, where the UAV information includes the ADS-B related information. The TIS-B server component 1430 may select a TIS-B server based on the BRID information.

Figure 15:
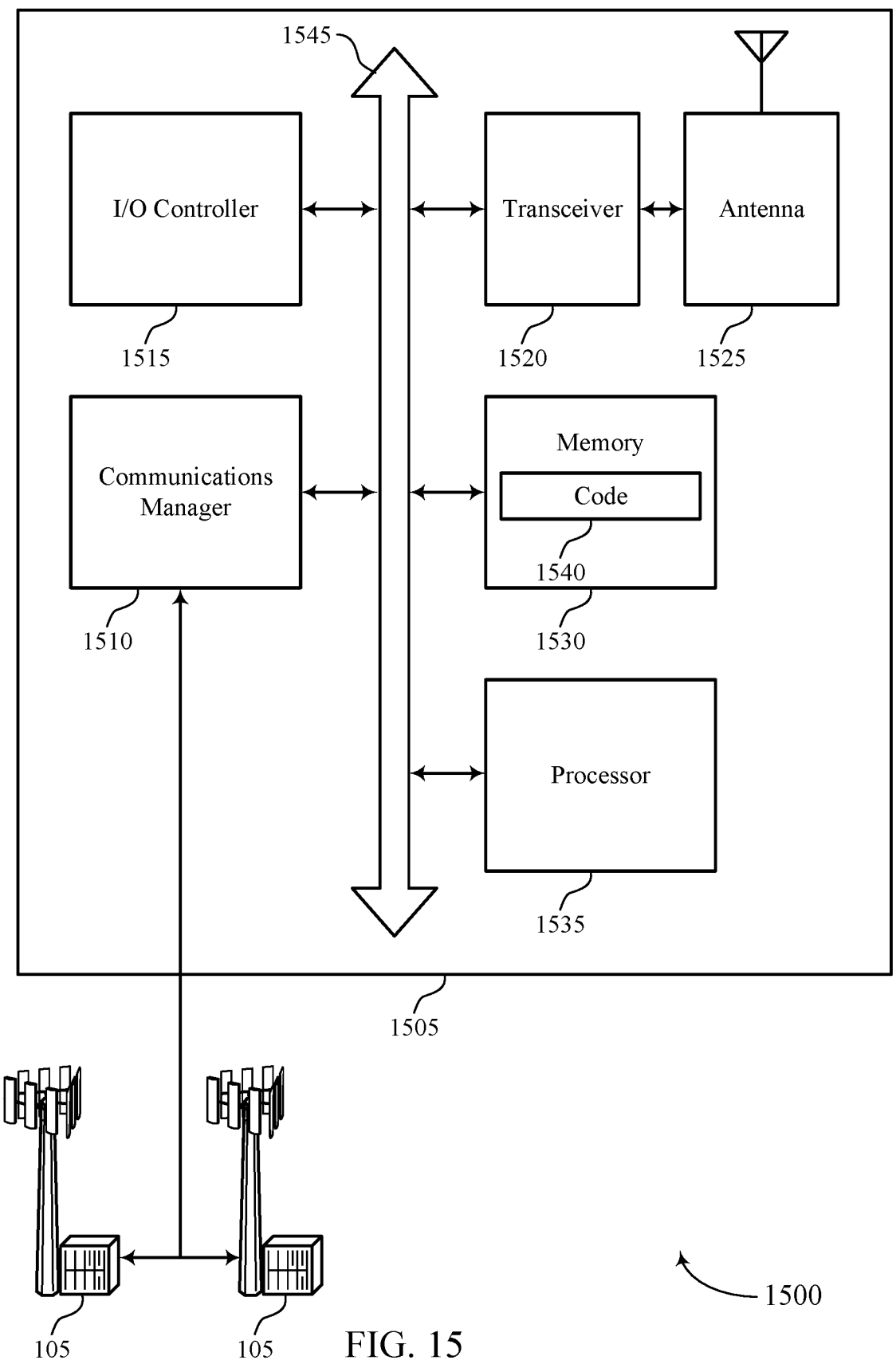
FIG. 15 shows a diagram of a system including a device that supports techniques for broadcasting flight information for UAVs in accordance with aspects of the present disclosure.

FIG. 15 shows a diagram of a system 1500 including a device 1505 that supports techniques for broadcasting flight information for UAVs in accordance with aspects of the present disclosure. The device 1505 may be an example of or include the components of device 1005, device 1105, device 1305, a USS, or a network entity, such as a UFMS, as described herein. The device 1505 may include components for bi-directional voice and data communications including components for transmitting and receiving communications, including a communications manager 1510, an I/O controller 1515, a transceiver 1520, an antenna 1525, memory 1530, and a processor 1535. These components may be in electronic communication via one or more buses (e.g., bus 1545).

The communications manager 1510 may receive, from a first wireless device, BRID information including an ID of a UAV, select a USS based on the ID of the UAV, receive the UAV information from the selected USS in response to the request, and transmit, to the selected USS, a request for UAV information associated with the UAV.

The communications manager 1510 may also receive, from a network entity, a request for UAV information associated with a UAV, the request including BRID information including an ID of the UAV, determine the UAV information based on the BRID information, and transmit the UAV information to the network entity.

In some examples, the communications manager 1510 may manage communications with one or more base stations 105, and may include a controller or scheduler for controlling communications with UEs 115 (or UAVs) in cooperation with the base stations 105. For example, the communications manager 1510 may coordinate scheduling for transmissions to UEs 115 or UAVs for various interference mitigation techniques such as beamforming or joint transmission. In some examples, the communications manager 1510 may provide an X2 interface within an LTE/LTE-A/ NR/5G wireless communication network technology to provide communication between base stations 105.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515. In some examples, the I/O controller 1515 may manage communications with the core network (e.g., via one or more wired backhaul links). For example, the network communications manager 915 may manage the transfer of data communications for client devices, such as one or more UEs 115, one or more UAVs, or the like.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the device 1505 may include a single antenna 1525. However, in some cases the device may have more than one antenna 1525, which may be capable of concurrently transmitting or receiving multiple wireless transmissions.

The memory 1530 may include RAM and ROM. The memory 1530 may store computer-readable, computer-executable code 1540 including instructions that, when executed, cause the processor to perform various functions described herein. In some cases, the memory 1530 may contain, among other things, a BIOS which may control basic hardware or software operation such as the interaction with peripheral components or devices.

The processor 1535 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1535 may be configured to operate a memory array using a memory controller. In other cases, a memory controller may be integrated into the processor 1535. The processor 1535 may be configured to execute computer-readable instructions stored in a memory (e.g., the memory 1530) to cause the device 1505 to perform various functions (e.g., functions or tasks supporting techniques for broadcasting flight information for UAVs).

The code 1540 may include instructions to implement aspects of the present disclosure, including instructions to support wireless communications. The code 1540 may be stored in a non-transitory computer-readable medium such as system memory or other type of memory. In some cases, the code 1540 may not be directly executable by the processor 1535 but may cause a computer (e.g., when compiled and executed) to perform functions described herein.

Figure 16:
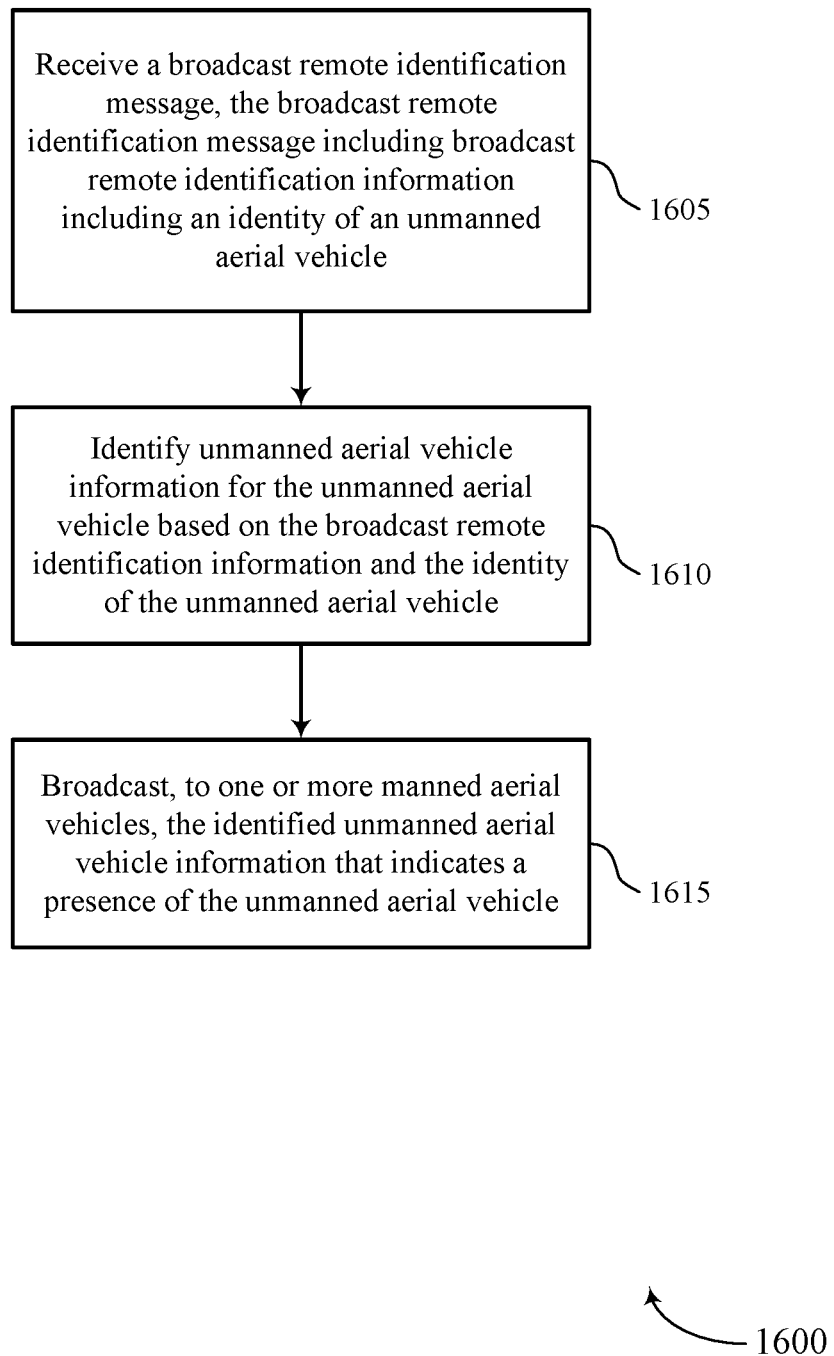
FIGS. 16 through 20 show flowcharts illustrating methods that support techniques for broadcasting flight information for UAVs in accordance with aspects of the present disclosure.

FIG. 16 shows a flowchart illustrating a method 1600 that supports techniques for broadcasting flight information for UAVs in accordance with aspects of the present disclosure. The operations of method 1600 may be implemented by a wireless device, such as a UE 115, base station 105, or wireless repeater, or its components as described herein. For example, the operations of method 1600 may be performed by a communications manager as described with reference to FIGS. 5 through 9. In some examples, a wireless device may execute a set of instructions to control the functional elements of the wireless device to perform the functions described herein. Additionally or alternatively, a wireless device may perform aspects of the functions described herein using special-purpose hardware.

At 1605, the wireless device may receive a BRID message (e.g., from a UAV), the BRID message including BRID information including an ID of the UAV. The operations of 1605 may be performed according to the methods described herein. In some examples, aspects of the operations of 1605 may be performed by a BRID manager as described with reference to FIGS. 5 through 9.

At 1610, the wireless device may identify UAV information for the UAV based on the BRID information and the ID of the UAV. The operations of 1610 may be performed according to the methods described herein. In some examples, aspects of the operations of 1610 may be performed by a UAV manager as described with reference to FIGS. 5 through 9.

At 1615, the wireless device may broadcast, to one or more manned aerial vehicles, the identified UAV information that indicates a presence of the UAV. The operations of 1615 may be performed according to the methods described herein. In some examples, aspects of the operations of 1615 may be performed by a broadcast manager as described with reference to FIGS. 5 through 9.

Figure 17:
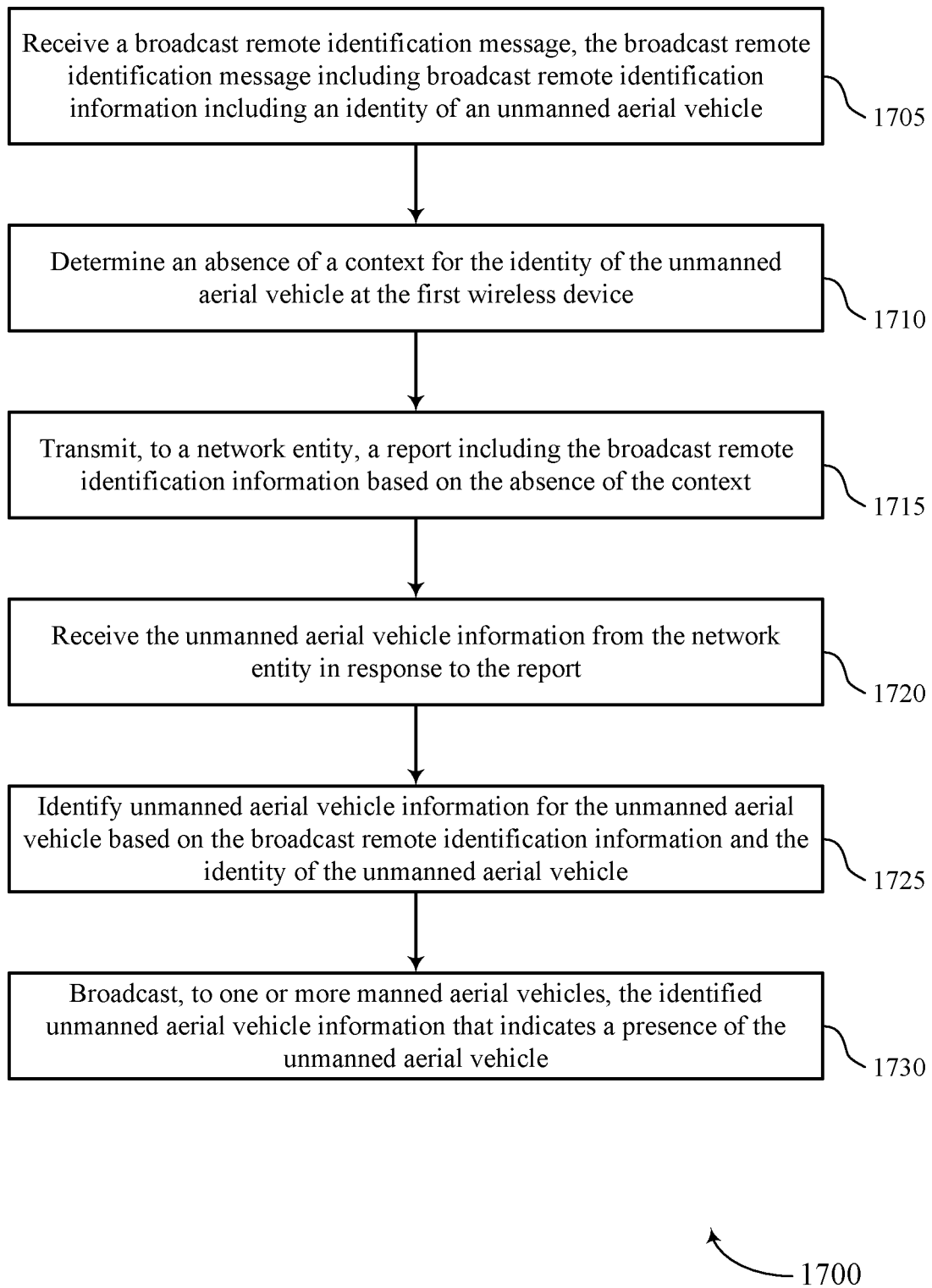

FIG. 17 shows a flowchart illustrating a method 1700 that supports techniques for broadcasting flight information for UAVs in accordance with aspects of the present disclosure. The operations of method 1700 may be implemented by wireless device, such as a UE 115, base station 105, or wireless repeater, or its components as described herein. For example, the operations of method 1700 may be performed by a communications manager as described with reference to FIGS. 5 through 9. In some examples, a wireless device may execute a set of instructions to control the functional elements of the wireless device to perform the functions described herein. Additionally or alternatively, a wireless device may perform aspects of the functions described herein using special-purpose hardware.

At 1705, the wireless device may receive a BRID message, the BRID message including BRID information including an ID of a UAV. The operations of 1705 may be performed according to the methods described herein. In some examples, aspects of the operations of 1705 may be performed by a BRID manager as described with reference to FIGS. 5 through 9.

At 1710, the wireless device may determine an absence of a context for the ID of the UAV at the first wireless device. The operations of 1710 may be performed according to the methods described herein. In some examples, aspects of the operations of 1710 may be performed by a context component as described with reference to FIGS. 5 through 9.

At 1715, the wireless device may transmit, to a network entity, a report including the BRID information based on the absence of the context. The operations of 1715 may be performed according to the methods described herein. In some examples, aspects of the operations of 1715 may be performed by a UFMS manager as described with reference to FIGS. 5 through 9.

At 1720, the wireless device may receive the UAV information from the network entity in response to the report. The operations of 1720 may be performed according to the methods described herein. In some examples, aspects of the operations of 1720 may be performed by a UAV manager as described with reference to FIGS. 5 through 9.

At 1725, the wireless device may identify UAV information for the UAV based on the BRID information and the ID of the UAV. The operations of 1725 may be performed according to the methods described herein. In some examples, aspects of the operations of 1725 may be performed by a UAV manager as described with reference to FIGS. 5 through 9.

At 1730, the wireless device may broadcast, to one or more manned aerial vehicles, the identified UAV information that indicates a presence of the UAV. The operations of 1730 may be performed according to the methods described herein. In some examples, aspects of the operations of 1730 may be performed by a broadcast manager as described with reference to FIGS. 5 through 9.

Figure 18:
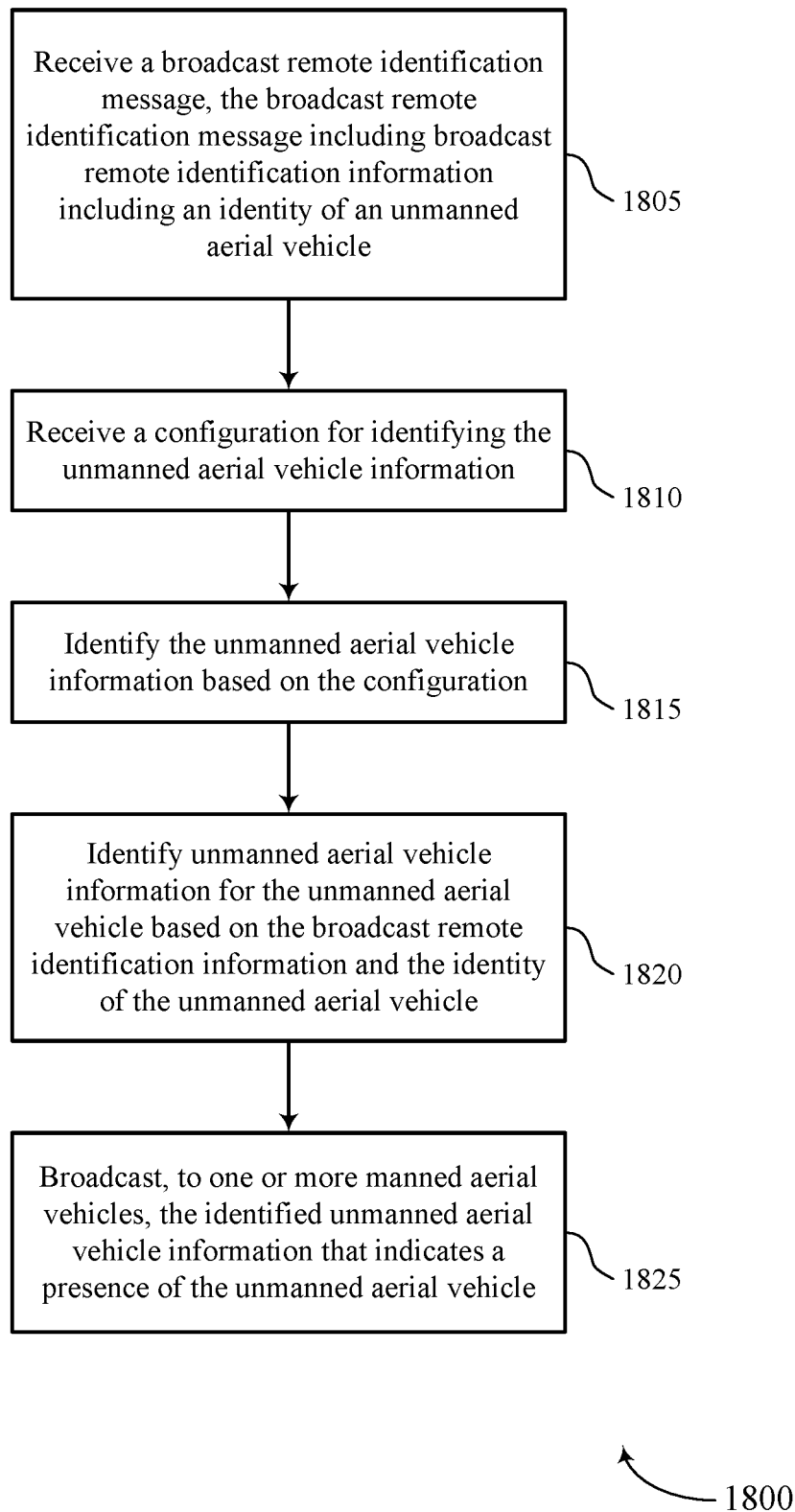

FIG. 18 shows a flowchart illustrating a method 1800 that supports techniques for broadcasting flight information for UAVs in accordance with aspects of the present disclosure. The operations of method 1800 may be implemented by a wireless device, such as a UE 115, base station 105, or wireless repeater, or its components as described herein. For example, the operations of method 1800 may be performed by a communications manager as described with reference to FIGS. 5 through 9. In some examples, a wireless device may execute a set of instructions to control the functional elements of the wireless device to perform the functions described herein. Additionally or alternatively, a wireless device may perform aspects of the functions described herein using special-purpose hardware.

At 1805, the wireless device may receive a BRID message, the BRID message including BRID information including an ID of a UAV. The operations of 1805 may be performed according to the methods described herein. In some examples, aspects of the operations of 1805 may be performed by a BRID manager as described with reference to FIGS. 5 through 9.

At 1810, the wireless device may receive a configuration for identifying the UAV information. The operations of 1810 may be performed according to the methods described herein. In some examples, aspects of the operations of 1810 may be performed by a configuration manager as described with reference to FIGS. 5 through 9.

At 1815, the wireless device may identify the UAV information based on the configuration. The operations of 1815 may be performed according to the methods described herein. In some examples, aspects of the operations of 1815 may be performed by a UAV manager as described with reference to FIGS. 5 through 9.

At 1820, the wireless device may identify UAV information for the UAV based on the BRID information and the ID of the UAV. The operations of 1820 may be performed according to the methods described herein. In some examples, aspects of the operations of 1820 may be performed by a UAV manager as described with reference to FIGS. 5 through 9.

At 1825, the wireless device may broadcast, to one or more manned aerial vehicles, the identified UAV information that indicates a presence of the UAV. The operations of 1825 may be performed according to the methods described herein. In some examples, aspects of the operations of 1825 may be performed by a broadcast manager as described with reference to FIGS. 5 through 9.

Figure 19:
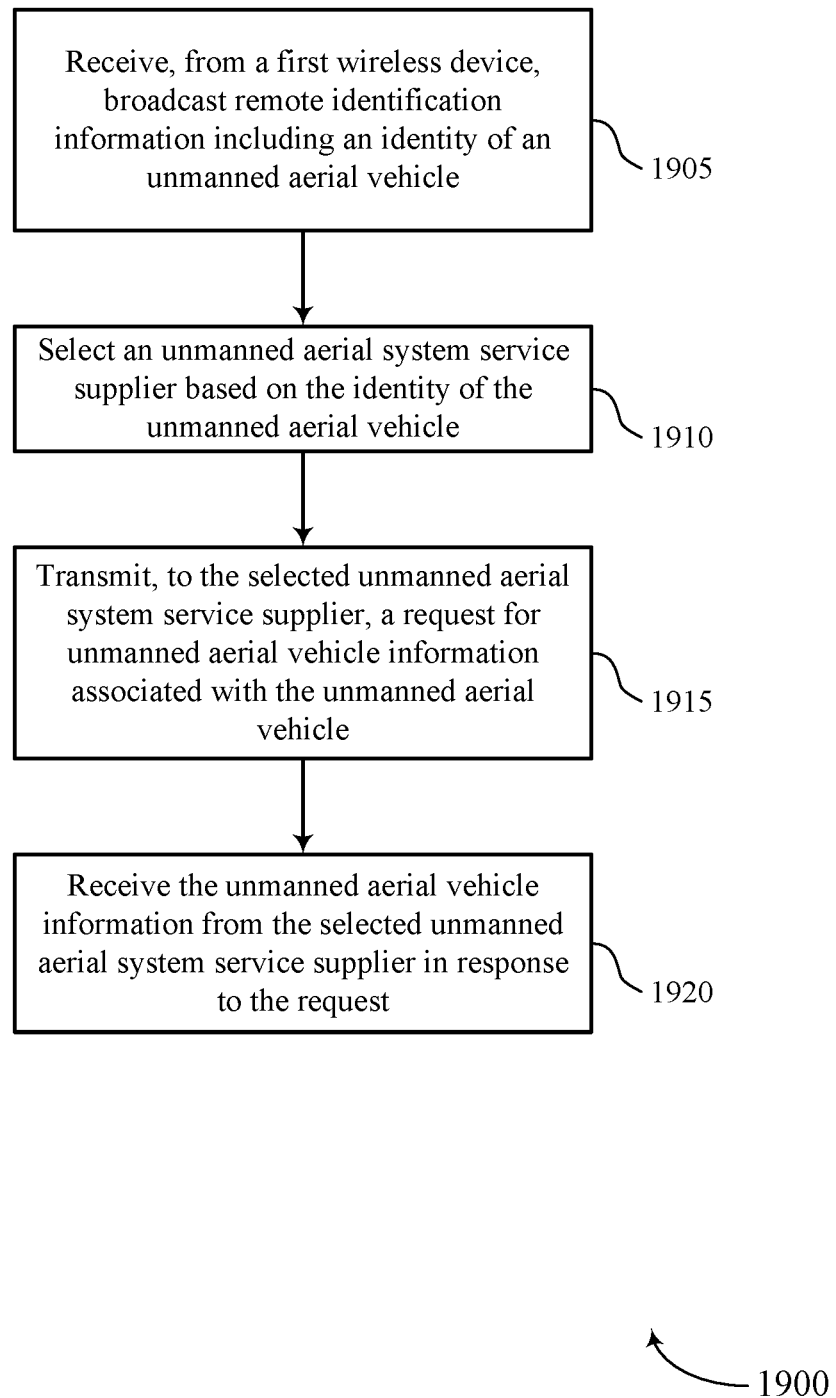

FIG. 19 shows a flowchart illustrating a method 1900 that supports techniques for broadcasting flight information for UAVs in accordance with aspects of the present disclosure. The operations of method 1900 may be implemented by a network entity, such as a UFMS, a network node, or network function that is part of a core network or communicates with a core network, or its components as described herein. For example, the operations of method 1900 may be performed by a communications manager as described with reference to FIGS. 10 through 12 and 15. In some examples, a network entity may execute a set of instructions to control the functional elements of the network entity to perform the functions described herein. Additionally or alternatively, a network entity may perform aspects of the functions described herein using special-purpose hardware.

At 1905, the network entity may receive, from a first wireless device, BRID information including an ID of a UAV. The operations of 1905 may be performed according to the methods described herein. In some examples, aspects of the operations of 1905 may be performed by a BRID component as described with reference to FIGS. 10 through 12 and 15.

At 1910, the network entity may select a USS based on the ID of the UAV. The operations of 1910 may be performed according to the methods described herein. In some examples, aspects of the operations of 1910 may be performed by a USS manager as described with reference to FIGS. 10 through 12 and 15.

At 1915, the network entity may transmit, to the selected USS, a request for UAV information associated with the UAV. The operations of 1915 may be performed according to the methods described herein. In some examples, aspects of the operations of 1915 may be performed by a request manager as described with reference to FIGS. 10 through 12 and 15.

At 1920, the network entity may receive the UAV information from the selected USS in response to the request. The operations of 1920 may be performed according to the methods described herein. In some examples, aspects of the operations of 1920 may be performed by a USS manager as described with reference to FIGS. 10 through 12 and 15.

Figure 20:
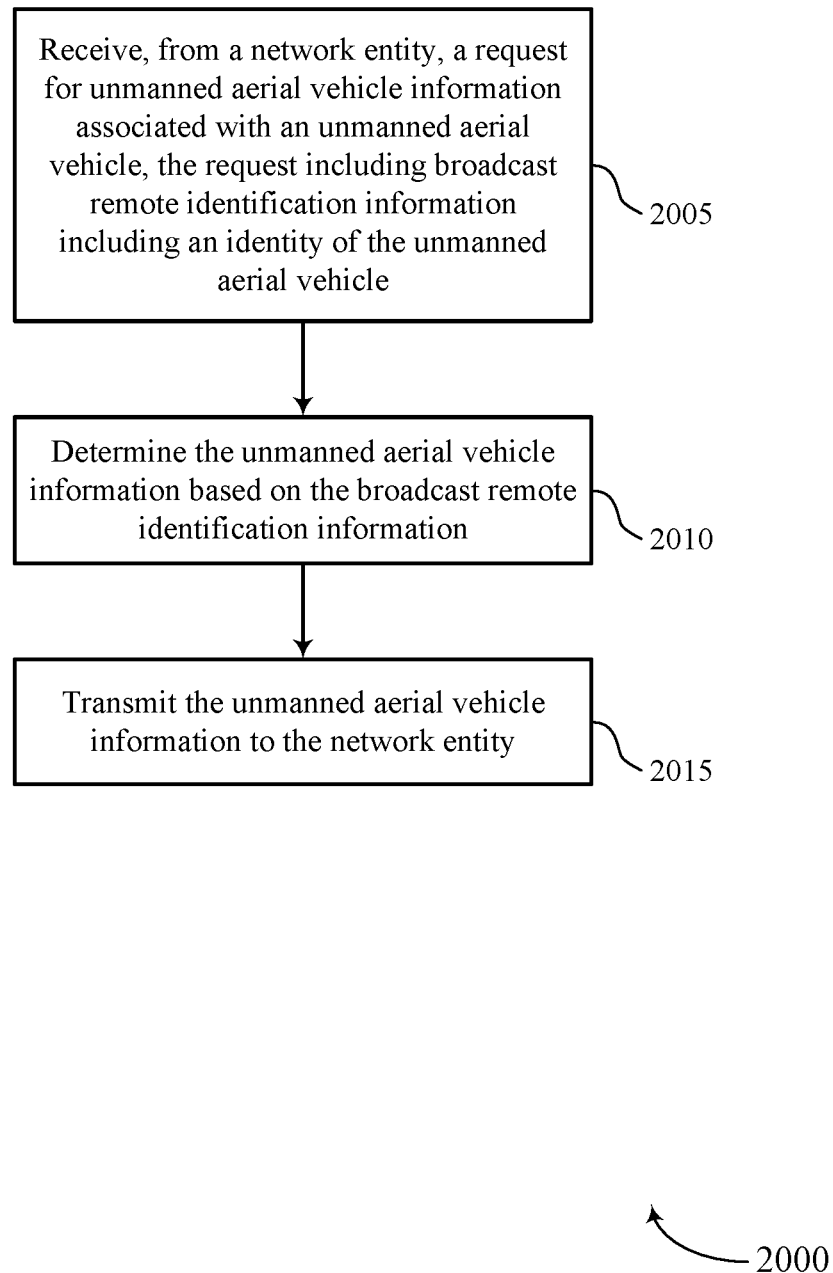

FIG. 20 shows a flowchart illustrating a method 2000 that supports techniques for broadcasting flight information for UAVs in accordance with aspects of the present disclosure. The operations of method 2000 may be implemented by a network entity (e.g., a USS or other like server or function) or its components as described herein. For example, the operations of method 2000 may be performed by a communications manager as described with reference to FIGS. 10 and 13 through 15. In some examples, a network entity may execute a set of instructions to control the functional elements of the network entity to perform the functions described herein. Additionally or alternatively, a network entity may perform aspects of the functions described herein using special-purpose hardware.

At 2005, the USS may receive, from a network entity, a request for UAV information associated with a UAV, the request including BRID information including an ID of the UAV. The operations of 2005 may be performed according to the methods described herein. In some examples, aspects of the operations of 2005 may be performed by a UAV management component as described with reference to FIGS. 10 and 13 through 15.

At 2010, the USS may determine the UAV information based on the BRID information. The operations of 2010 may be performed according to the methods described herein. In some examples, aspects of the operations of 2010 may be performed by a UAV information manager as described with reference to FIGS. 10 and 13 through 15.

At 2015, the USS may transmit the UAV information to the network entity. The operations of 2015 may be performed according to the methods described herein. In some examples, aspects of the operations of 2015 may be performed by a UAV information manager as described with reference to FIGS. 10 and 13 through 15.

The following provides an overview of aspects of the present disclosure:

Aspect 1: A method for wireless communication at a first wireless device, comprising: receiving, from a UAV, a BRID message, the BRID message comprising BRID information including an ID of the UAV; identifying UAV information for the UAV based at least in part on the BRID information and the ID of the UAV; and broadcasting, to one or more manned aerial vehicles, the identified UAV information that indicates a presence of the UAV.

Aspect 2: The method of aspect 1, wherein identifying the UAV information comprises: determining an absence of a context for the ID of the UAV at the first wireless device; transmitting, to a network entity, a report comprising the BRID information based at least in part on the absence of the context; and receiving the UAV information from the network entity in response to the report.

Aspect 3: The method of aspect 2, further comprising: selecting the network entity based at least in part on the ID of the UAV.

Aspect 4: The method of any of aspects 2 through 3, further comprising: selecting the network entity based at least in part on a location of the UAV, or a traffic management authority associated with the location of the UAV, or any combination thereof.

Aspect 5: The method of any of aspects 2 through 4, wherein the report comprises the ID of the UAV and location information for the UAV based at least in part on the BRID information.

Aspect 6: The method of any of aspects 1 through 5, wherein identifying the UAV information comprises: receiving a configuration for identifying the UAV information; and identifying the UAV information based at least in part on the configuration.

Aspect 7: The method of aspect 6, further comprising: identifying a position of a manned aircraft based at least in part on detecting one or more ADS-B messages; and determining, in accordance with the configuration, that a separation between the manned aircraft and the UAV satisfies a threshold based at least in part on the position of the manned aircraft, wherein broadcasting the UAV information is based at least in part on the separation satisfying the threshold.

Aspect 8: The method of any of aspects 6 through 7, wherein the configuration comprises a set of parameters associated with one or more unmanned aerial system service suppliers, the UAV information is identified based at least in part on the set of parameters.

Aspect 9: The method of any of aspects 6 through 8, further comprising: identifying, in accordance with the configuration, a location of the UAV based at least in part on the BRID information, wherein broadcasting the UAV information is based at least in part on the UAV being located within a region or cell associated with the first wireless device.

Aspect 10: The method of aspect 9, further comprising: determining the location of the UAV based at least in part on location information that includes GPS information, triangulation information, one or more RSSIs, or any combination thereof, wherein determining the location of the UAV comprises identifying the location information of the UAV, augmenting the location information of the UAV, verifying the location information of the UAV, or any combination thereof.

Aspect 11: The method of any of aspects 1 through 10, wherein broadcasting the UAV information comprises: generating a TIS-B message comprising the UAV information; and broadcasting the TIS-B message to the one or more manned aerial vehicles.

Aspect 12: The method of any of aspects 1 through 11, further comprising: receiving, from a network entity, a request to broadcast information associated with one or more UAVs, the request including the information to be broadcast; and broadcasting the information associated with the one or more UAVs in accordance with the request.

Aspect 13: The method of any of aspects 1 through 12, further comprising: receiving, from a network entity, a subscription request for information reporting associated with one or more UAVs; and transmitting a confirmation of the subscription request to the network entity.

Aspect 14: The method of aspect 13, further comprising: transmitting, via the network entity, an information report to a TIS-B server based at least in part on the subscription request, the information report comprising one or more of BRID information or GPS information associated with the one or more UAVs.

Aspect 15: The method of any of aspects 1 through 14, further comprising: generating an ADS-B message comprising the UAV information; and broadcasting the ADS-B message to the one or more manned aerial vehicles.

Aspect 16: The method of any of aspects 1 through 15, further comprising: receiving, from a network entity, a request to report the BRID information to a second wireless device; and transmitting the BRID information to the second wireless device in accordance with the received request.

Aspect 17: The method of aspect 16, wherein the request comprises a configuration of a time duration for reporting the BRID information, a radio frequency for reporting the BRID information, one or more geofenced areas, a configuration indicating an ADS-B message broadcast rate for the UAV, or any combination thereof.

Aspect 18: A method for wireless communication at a network entity, comprising: receiving, from a first wireless device, BRID information comprising an ID of a UAV; selecting a USS based at least in part on the ID of the UAV; transmitting, to the selected USS, a request for UAV information associated with the UAV; and receiving the UAV information from the selected USS in response to the request.

Aspect 19: The method of aspect 18, further comprising: transmitting, to the first wireless device, a request to report at least the BRID information to a second wireless device based at least in part on a location of the UAV, the request comprising a configuration of a time duration for reporting the BRID information, a radio frequency for reporting the BRID information, or any combination thereof.

Aspect 20: The method of any of aspects 18 through 19, further comprising: transmitting, to the first wireless device, a configuration for identifying the UAV information.

Aspect 21: The method of any of aspects 18 through 20, further comprising: receiving, from the USS, an indication of one or both of a flight schedule or planned trajectory for one or more UAVs; selecting one or more wireless devices for broadcasting UAV information for the one or more UAVs based at least in part on the flight schedule, or the planned trajectory, or any combination thereof; and transmitting, to each of the one or more wireless devices, a request to broadcast the UAV information for the one or more UAVs.

Aspect 22: The method of any of aspects 18 through 21, wherein the UAV information comprises the ID of the UAV, ADS-B identification information for the UAV, location information for the UAV, or any combination thereof.

Aspect 23: The method of any of aspects 18 through 22, wherein the first wireless device comprises a base station, or a user equipment, or a repeater device.

Aspect 24: The method of any of aspects 18 through 23, wherein the network entity comprises a UFMS.

Aspect 25: A method for wireless communication at a USS, comprising: receiving, from a network entity, a request for UAV information associated with a UAV, the request comprising BRID information including an ID of the UAV; determining the UAV information based at least in part on the BRID information; and transmitting the UAV information to the network entity.

Aspect 26: The method of aspect 25, further comprising: determining a location of the UAV based at least in part on the BRID information; and transmitting a confirmation of the location to the network entity.

Aspect 27: The method of any of aspects 25 through 26, wherein transmitting the UAV information comprises: transmitting ADS-B related information based at least in part on the BRID information, wherein the UAV information comprises the ADS-B related information.

Aspect 28: The method of any of aspects 25 through 27, further comprising: identifying one or more flight profiles including flight schedules for one or more UAVs, one or more trajectories for the one or more UAVs, one or more maneuvers for the one or more UAVs, or any combination thereof; and transmitting, to the network entity, an indication of the one or more flight profiles.

Aspect 29: The method of any of aspects 25 through 28, wherein the request from the network entity comprises a request for relaying detected ADS-B information for representation in one or more traffic management systems, the detected ADS-B information being received from a manned aircraft by the network entity.

Aspect 30: An apparatus for wireless communication at a first wireless device, comprising a processor; memory coupled with the processor; and instructions stored in the memory and executable by the processor to cause the apparatus to perform a method of any of aspects 1 through 17.

Aspect 31: An apparatus for wireless communication at a first wireless device, comprising at least one means for performing a method of any of aspects 1 through 17.

Aspect 32: A non-transitory computer-readable medium storing code for wireless communication at a first wireless device, the code comprising instructions executable by a processor to perform a method of any of aspects 1 through 17.

Aspect 33: An apparatus for wireless communication at a network entity, comprising a processor; memory coupled with the processor; and instructions stored in the memory and executable by the processor to cause the apparatus to perform a method of any of aspects 18 through 24.

Aspect 34: An apparatus for wireless communication at a network entity, comprising at least one means for performing a method of any of aspects 18 through 24.

Aspect 35: A non-transitory computer-readable medium storing code for wireless communication at a network entity, the code comprising instructions executable by a processor to perform a method of any of aspects 18 through 24.

Aspect 36: An apparatus for wireless communication at a USS, comprising a processor; memory coupled with the processor; and instructions stored in the memory and executable by the processor to cause the apparatus to perform a method of any of aspects 25 through 29.

Aspect 37: An apparatus for wireless communication at a USS, comprising at least one means for performing a method of any of aspects 25 through 29.

Aspect 38: A non-transitory computer-readable medium storing code for wireless communication at a USS, the code comprising instructions executable by a processor to perform a method of any of aspects 25 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
    receiving a broadcast remote identification message, the broadcast remote identification message comprising broadcast remote identification information including an identity of an unmanned aerial vehicle;
    identifying unmanned aerial vehicle information for the unmanned aerial vehicle based at least in part on a received configuration for identifying the unmanned aerial vehicle information, the broadcast remote identification information and the identity of the unmanned aerial vehicle; and
    broadcasting, to one or more manned aerial vehicles, the identified unmanned aerial vehicle information that indicates a presence of the unmanned aerial vehicle.

2. The method of claim 1, wherein identifying the unmanned aerial vehicle information comprises:
    determining an absence of a context for the identity of the unmanned aerial vehicle at the first wireless device;
    transmitting, to a network entity, a report comprising the broadcast remote identification information based at least in part on the absence of the context; and
    receiving the unmanned aerial vehicle information from the network entity in response to the report.

3. The method of claim 2, further comprising:
    selecting the network entity based at least in part on the identity of the unmanned aerial vehicle.

4. The method of claim 2, further comprising:
    selecting the network entity based at least in part on a location of the unmanned aerial vehicle, or a traffic management authority associated with the location of the unmanned aerial vehicle, or any combination thereof.

5. The method of claim 2, wherein the report comprises the identity of the unmanned aerial vehicle and location information for the unmanned aerial vehicle based at least in part on the broadcast remote identification information.

6. The method of claim 1, further comprising:
    identifying a position of a manned aircraft based at least in part on detecting one or more automatic dependent surveillance broadcast (ADS-B) messages; and
    determining, in accordance with the configuration, that a separation between the manned aircraft and the unmanned aerial vehicle satisfies a threshold based at least in part on the position of the manned aircraft, wherein broadcasting the unmanned aerial vehicle information is based at least in part on the separation satisfying the threshold.

7. The method of claim 1, wherein the configuration comprises a set of parameters associated with one or more unmanned aerial system service suppliers, wherein the unmanned aerial vehicle information is identified based at least in part on the set of parameters.

8. The method of claim 1, further comprising:
    identifying, in accordance with the configuration, a location of the unmanned aerial vehicle based at least in part on the broadcast remote identification information, wherein broadcasting the unmanned aerial vehicle information is based at least in part on the unmanned aerial vehicle being located within a region or cell associated with the first wireless device.

9. The method of claim 8, further comprising:
determining the location of the unmanned aerial vehicle based at least in part on location information that includes global positioning system (GPS) information, triangulation information, one or more received signal strength indicators (RSSIs), or any combination thereof, wherein determining the location of the unmanned aerial vehicle comprises identifying the location information of the unmanned aerial vehicle, augmenting the location information of the unmanned aerial vehicle, verifying the location information of the unmanned aerial vehicle, or any combination thereof.

10. The method of claim 1, wherein broadcasting the unmanned aerial vehicle information comprises:
generating a traffic information service broadcast (TIS-B) message comprising the unmanned aerial vehicle information; and
broadcasting the TIS-B message to the one or more manned aerial vehicles.

11. The method of claim 1, further comprising:
receiving, from a network entity, a request to broadcast information associated with one or more unmanned aerial vehicles, the request including the information to be broadcast; and
broadcasting the information associated with the one or more unmanned aerial vehicles in accordance with the request.

12. The method of claim 1, further comprising:
receiving, from a network entity, a subscription request for information reporting associated with one or more unmanned aerial vehicles; and
transmitting a confirmation of the subscription request to the network entity.

13. The method of claim 12, further comprising:
transmitting, via the network entity, an information report to a traffic information service broadcast (TIS-B) server based at least in part on the subscription request, the information report comprising one or more of broadcast remote identification information or global positioning system information associated with the one or more unmanned aerial vehicles.

14. The method of claim 1, further comprising:
generating an automatic dependent surveillance broadcast (ADS-B) message comprising the unmanned aerial vehicle information; and
broadcasting the ADS-B message to the one or more manned aerial vehicles.

15. The method of claim 1, further comprising:
receiving, from a network entity, a request to report the broadcast remote identification information to a second wireless device; and
transmitting the broadcast remote identification information to the second wireless device in accordance with the received request.

16. The method of claim 15, wherein the request comprises a configuration of a time duration for reporting the broadcast remote identification information, a radio frequency for reporting the broadcast remote identification information, one or more geofenced areas, a configuration indicating an automatic dependent surveillance broadcast (ADS-B) message broadcast rate for the unmanned aerial vehicle, or any combination thereof.

17. A method for wireless communication at a network entity, comprising:
receiving, from a first wireless device, broadcast remote identification information comprising an identity of an unmanned aerial vehicle;
selecting an unmanned aerial system service supplier based at least in part on the identity of the unmanned aerial vehicle;
transmitting, to the selected unmanned aerial system service supplier, a request for unmanned aerial vehicle information associated with the unmanned aerial vehicle; and
receiving the unmanned aerial vehicle information from the selected unmanned aerial system service supplier in response to the request.

18. The method of claim 17, further comprising:
transmitting, to the first wireless device, a request to report at least the broadcast remote identification information to a second wireless device based at least in part on a location of the unmanned aerial vehicle, the request comprising a configuration of a time duration for reporting the broadcast remote identification information, a radio frequency for reporting the broadcast remote identification information, or any combination thereof.

19. The method of claim 17, further comprising:
transmitting, to the first wireless device, a configuration for identifying the unmanned aerial vehicle information.

20. The method of claim 17, further comprising:
receiving, from the unmanned aerial system service supplier, an indication of one or both of a flight schedule or planned trajectory for one or more unmanned aerial vehicles;
selecting one or more wireless devices for broadcasting unmanned aerial vehicle information for the one or more unmanned aerial vehicles based at least in part on the flight schedule, or the planned trajectory, or any combination thereof; and
transmitting, to each of the one or more wireless devices, a request to broadcast the unmanned aerial vehicle information for the one or more unmanned aerial vehicles.

21. The method of claim 17, wherein the unmanned aerial vehicle information comprises the identity of the unmanned aerial vehicle, automatic dependent surveillance broadcast (ADS-B) identification information for the unmanned aerial vehicle, location information for the unmanned aerial vehicle, or any combination thereof.

22. The method of claim 17, wherein the first wireless device comprises a base station, or a user equipment, or a repeater device.

23. The method of claim 17, wherein the network entity comprises a UAV flight management system (UFMS).

24. A method for wireless communication at an unmanned aerial system service supplier, comprising:
receiving, from a network entity, a request for unmanned aerial vehicle information associated with an unmanned aerial vehicle, the request comprising broadcast remote identification information including an identity of the unmanned aerial vehicle;
determining the unmanned aerial vehicle information based at least in part on the broadcast remote identification information; and
transmitting the unmanned aerial vehicle information to the network entity.

25. The method of claim 24, further comprising:
determining a location of the unmanned aerial vehicle based at least in part on the broadcast remote identification information; and
transmitting a confirmation of the location to the network entity.

26. The method of claim 24, wherein transmitting the unmanned aerial vehicle information comprises:
transmitting automatic dependent surveillance broadcast (ADS-B) related information based at least in part on the broadcast remote identification information, wherein the unmanned aerial vehicle information comprises the ADS-B related information.

27. The method of claim 24, further comprising:
identifying one or more flight profiles including flight schedules for one or more unmanned aerial vehicles, one or more trajectories for the one or more unmanned aerial vehicles, one or more maneuvers for the one or more unmanned aerial vehicles, or any combination thereof; and
transmitting, to the network entity, an indication of the one or more flight profiles.

28. The method of claim 24, wherein the request from the network entity comprises a request for relaying detected automatic dependent surveillance broadcast (ADS-B) information for representation in one or more traffic management systems, the detected ADS-B information being received from a manned aircraft by the network entity.

29. An apparatus for wireless communication at a first wireless device, comprising:
a processor,
memory coupled with the processor; and
instructions stored in the memory and executable by the processor to cause the apparatus to:
receive, from an unmanned aerial vehicle, a broadcast remote identification message, the broadcast remote identification message comprising broadcast remote identification information including an identity of the unmanned aerial vehicle;
identify unmanned aerial vehicle information for the unmanned aerial vehicle based at least in part on a received configuration for identifying the unmanned aerial vehicle information, the broadcast remote identification information and the identity of the unmanned aerial vehicle; and
broadcast, to one or more manned aerial vehicles, the identified unmanned aerial vehicle information that indicates a presence of the unmanned aerial vehicle.

\* \* \* \* \*